(12) United States Patent
Chaturvedi et al.

(10) Patent No.: US 8,407,314 B2
(45) Date of Patent: Mar. 26, 2013

(54) SYSTEM AND METHOD FOR SHARING UNSUPPORTED DOCUMENT TYPES BETWEEN COMMUNICATION DEVICES

(75) Inventors: Sivakumar Chaturvedi, Allen, TX (US); Satish Gundabathula, Irving, TX (US)

(73) Assignee: Damaka, Inc., Richardson, TX (US)

( * ) Notice: Subject to any disclaimer, the term of this patent is extended or adjusted under 35 U.S.C. 154(b) by 169 days.

(21) Appl. No.: 13/079,665

(22) Filed: Apr. 4, 2011

(65) Prior Publication Data

US 2012/0254348 A1  Oct. 4, 2012

(51) Int. Cl.
G06F 15/16 (2006.01)

(52) U.S. Cl. .................................. 709/217; 715/206

(58) Field of Classification Search .............. 709/203, 709/217; 715/206
See application file for complete search history.

(56) References Cited

U.S. PATENT DOCUMENTS

| | | |
|---|---|---|
| 5,442,637 A | 8/1995 | Nguyen |
| 5,761,309 A | 6/1998 | Ohashi et al. |
| 5,790,637 A | 8/1998 | Johnson et al. |
| 5,818,447 A * | 10/1998 | Wolf et al. .................... 715/752 |
| 5,889,762 A | 3/1999 | Pajuvirta et al. |
| 6,031,818 A | 2/2000 | Lo et al. |
| 6,141,687 A | 10/2000 | Blair |
| 6,202,084 B1 | 3/2001 | Kumar et al. |
| 6,219,638 B1 | 4/2001 | Padmanabhan et al. |
| 6,311,150 B1 | 10/2001 | Ramaswamy et al. |
| 6,343,067 B1 | 1/2002 | Drottar et al. |
| 6,360,196 B1 | 3/2002 | Poznaski et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,741,691 B1 | 5/2004 | Ritter et al. |
| 6,766,373 B1 | 7/2004 | Beadle |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |

(Continued)

FOREIGN PATENT DOCUMENTS

| | | |
|---|---|---|
| EP | 1404082 A2 | 3/2004 |
| JP | 2005-94600 | 4/2005 |

(Continued)

OTHER PUBLICATIONS

PCT: International Preliminary Report on Patentability of PCT/US2008/075141; Mar. 9, 2010; 5 pgs.

(Continued)

Primary Examiner — Yves Dalencourt
(74) Attorney, Agent, or Firm — Howison & Arnott, L.L.P.

(57) ABSTRACT

An improved system and method are used for sharing a document between two communication devices that do not have an application that can display the document. In one example, the document is sent by the communication device that is sharing the document to a document server for processing into pages of one or more different document types, and both communication devices retrieve the stored pages as needed for display. The sharing communication device updates the other communication device when a new page is to be retrieved from the document server.

29 Claims, 16 Drawing Sheets

U.S. PATENT DOCUMENTS

| | | |
|---|---|---|
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,013,155 B1 | 3/2006 | Ruf et al. |
| 7,079,529 B1 | 7/2006 | Khuc |
| 7,080,158 B1 | 7/2006 | Squire |
| 7,117,526 B1 | 10/2006 | Short |
| 7,184,415 B2 | 2/2007 | Chaney et al. |
| 7,272,377 B2 | 9/2007 | Cox et al. |
| 7,304,985 B2 | 12/2007 | Sojka et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,512,652 B1 | 3/2009 | Appelman et al. |
| 7,613,171 B2 | 11/2009 | Zehavi et al. |
| 7,778,187 B2 | 8/2010 | Chaturvedi et al. |
| 7,917,584 B2 * | 3/2011 | Arthursson ................... 709/217 |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0143548 A1 | 10/2002 | Korall et al. |
| 2002/0150110 A1 | 10/2002 | Inbar et al. |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0044020 A1 | 3/2003 | Aboba et al. |
| 2003/0046056 A1 | 3/2003 | Godoy et al. |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0217171 A1 | 11/2003 | Von Stuermer et al. |
| 2003/0220121 A1 | 11/2003 | Konishi et al. |
| 2004/0005877 A1 | 1/2004 | Vaananen |
| 2004/0034776 A1 | 2/2004 | Fernando et al. |
| 2004/0034793 A1 | 2/2004 | Yuan |
| 2004/0039781 A1 | 2/2004 | Lavallee et al. |
| 2004/0044517 A1 | 3/2004 | Palmquist |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0143678 A1 | 7/2004 | Chari et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0228279 A1 | 11/2004 | Midtun et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0136911 A1 | 6/2005 | Csapo et al. |
| 2005/0138119 A1 | 6/2005 | Saridakis |
| 2005/0143105 A1 | 6/2005 | Okamoto |
| 2005/0187957 A1 | 8/2005 | Kramer et al. |
| 2005/0195802 A1 | 9/2005 | Klein et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0286519 A1 | 12/2005 | Ravikumar et al. |
| 2006/0121986 A1 | 6/2006 | Pelkey et al. |
| 2006/0148516 A1 | 7/2006 | Reddy et al. |
| 2006/0168643 A1 | 7/2006 | Howard et al. |
| 2006/0183476 A1 | 8/2006 | Morita et al. |
| 2006/0218624 A1 | 9/2006 | Ravikumar et al. |
| 2006/0230166 A1 | 10/2006 | Philyaw |
| 2006/0246903 A1 | 11/2006 | Kong et al. |
| 2007/0016921 A1 | 1/2007 | Levi et al. |
| 2007/0078785 A1 | 4/2007 | Bush et al. |
| 2007/0110043 A1 | 5/2007 | Girard |
| 2007/0111794 A1 | 5/2007 | Hogan et al. |
| 2007/0190987 A1 | 8/2007 | Vaananen |
| 2008/0005328 A1 | 1/2008 | Shively et al. |
| 2008/0032695 A1 | 2/2008 | Zhu et al. |
| 2008/0069105 A1 | 3/2008 | Costa et al. |
| 2008/0192756 A1 | 8/2008 | Damola et al. |
| 2008/0320096 A1 | 12/2008 | Szeto |
| 2009/0192976 A1 | 7/2009 | Spivack et al. |
| 2009/0240821 A1 | 9/2009 | Juncker et al. |
| 2011/0145687 A1 * | 6/2011 | Grigsby et al. ................ 715/206 |

FOREIGN PATENT DOCUMENTS

| | | |
|---|---|---|
| JP | 2007-043598 | 2/2007 |
| KR | 10-2005-0030548 | 3/2005 |
| WO | WO 03/079635 | 9/2003 |
| WO | WO 2004/063843 | 7/2004 |
| WO | WO 2005/009019 | 1/2005 |
| WO | WO 2006/075677 A1 | 7/2006 |

OTHER PUBLICATIONS

PCT: International Preliminary Report on Patentability of PCT/US2007/068820; Dec. 31, 2008; 8 pgs.

PCT: International Preliminary Report on Patentability of PCT/US2007/068823; Nov. 27, 2008; 8 pgs.

PCT: International Preliminary Report on Patentability of PCT/US2006/047841; Nov. 6, 2008; 7 pgs.

PCT: International Preliminary Report on Patentability of PCT/US2007/002424; Aug. 7, 2008; 6 pgs.

PCT: International Preliminary Report on Patentability of PCT/US2006/040312; May 2, 2008; 5 pgs.

PCT: International Preliminary Report on Patentability of PCT/IB2005/000821; Oct. 19, 2006; 10 pgs.

Chathapuram, "Security in Peer-To-Peer Networks", Aug. 8. 2001, XP002251813.

International Search Report and Written Opinion of the International Searching Authority from PCT/IB2005/000821, dated Aug. 5, 2005.

International Search Report and Written Opinion of the International Searching Authority from PCT/US2006/032791, dated Dec. 18, 2006.

International Search Report and Written Opinion of the International Searching Authority from PCT/US2006/040312, dated Mar. 2, 2007.

International Search Report and Written Opinion of the International Searching Authority from PCT/US2006/047841, dated Sep. 12, 2008.

International Search Report and Written Opinion of the International Searching Authority from PCT/US2007/002424, dated Aug. 14, 2007.

International Search Report and Written Opinion of the International Searching Authority from PCT/US2007/068820, dated Jun. 11, 2008.

International Search Report and Written Opinion of the International Searching Authority from PCT/US2007/068821, dated Jun. 14, 2008.

International Search Report and Written Opinion of the International Searching Authority from PCT/US2007068823, dated Jun. 1, 2008.

Jeff Tyson, "How Instant Messaging Works", www.verizon.com/learningcenter, Mar. 9, 2005.

Rory Bland, et al, "P2P Routing" Mar. 2002.

Rosenberg, "STUN—Simple Traversal of UDP Through NAT", Sep. 2002, XP015005058.

Salman A. Baset, et al, "An Analysis of the Skype Peer-To-Peer Internet Telephony Protocol", Department of Computer Science, Columbia University, New York, NY, USA, Sep. 15, 2004.

Singh et al., "Peer-to Peer Internet Telephony Using SIP", Department of Computer Science, Columbia University, Oct. 31, 2004, XP-002336408.

Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].

Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.

International Search Report and Written Opinion of the International Searching Authority from PCT/US2008/078142, dated Mar. 27, 2009.

International Search Report and Written Opinion of the International Searching Authority from PCT/US2008/084950, dated Apr. 27, 2009.

Hao Wang, Skype VoIP service-architecture and comparison, In: INFOTECH Seminar Advanced Communication Services (ASC), 2005, pp. 4, 7, 8.

Seta, N.; Miyajima, H.; Zhang, L.;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.

International Search Report and Written Opinion of the International Searching Authority from PCT/US2008/075141, dated Mar. 5, 2009.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.

PCT: International Preliminary Report on Patentability of PCT/US2008/084950; Jun. 1, 2010; 5 pgs.

* cited by examiner

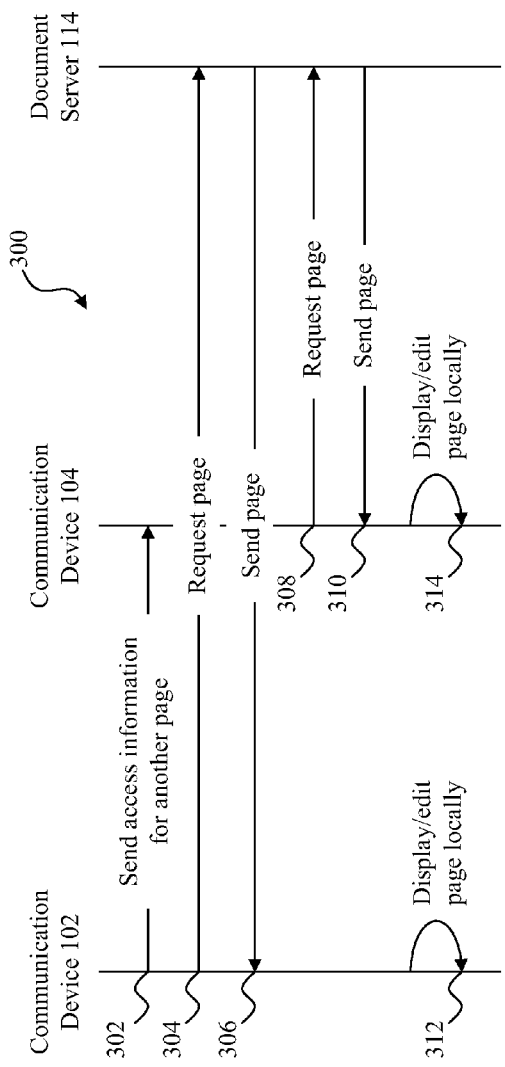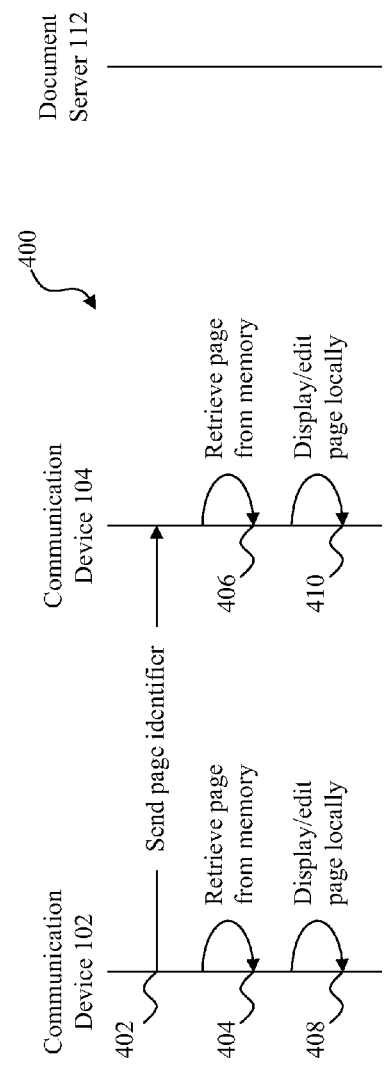

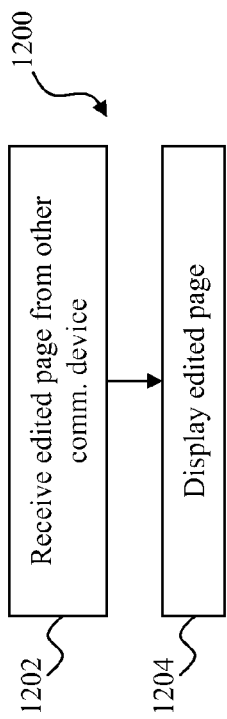
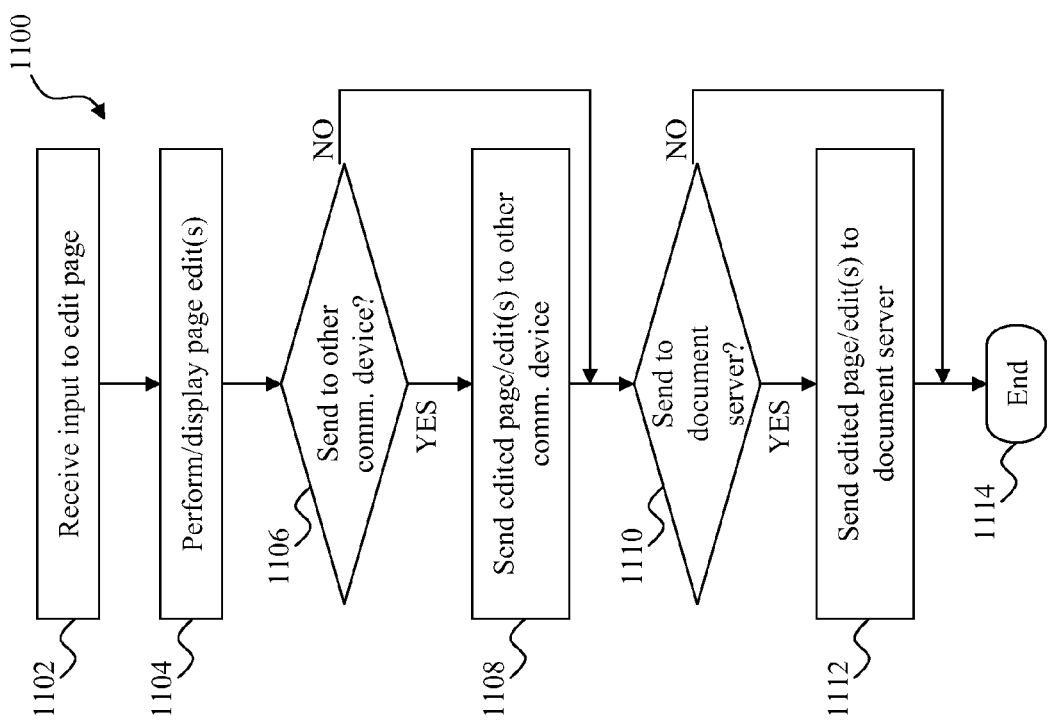

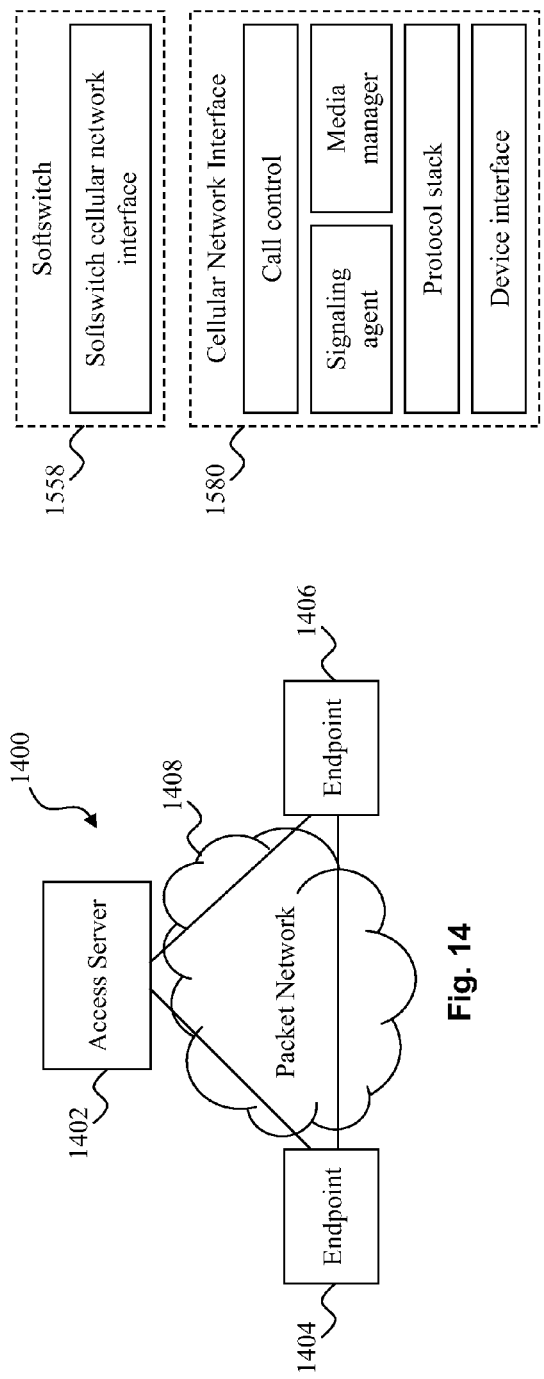
Fig. 14
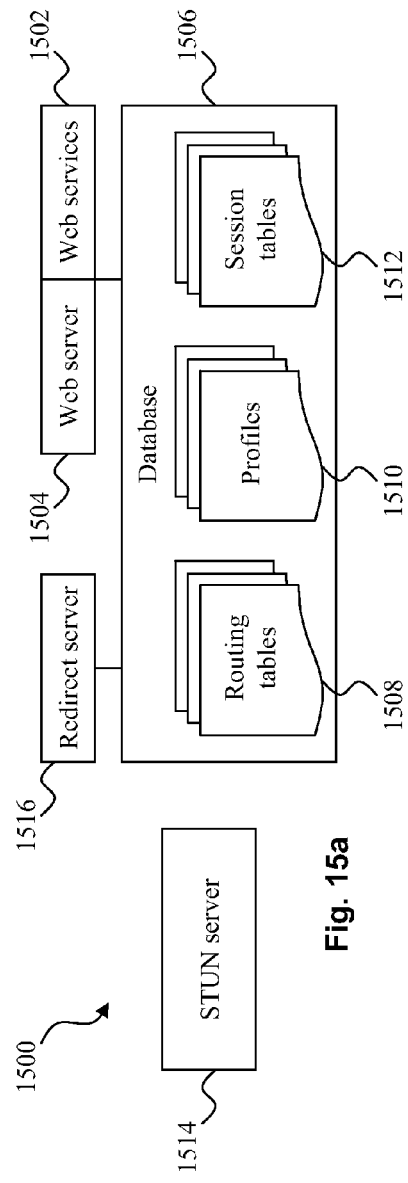
Fig. 15c
Fig. 15a

SYSTEM AND METHOD FOR SHARING UNSUPPORTED DOCUMENT TYPES BETWEEN COMMUNICATION DEVICES

INCORPORATION BY REFERENCE

The present application incorporates by reference in their entirety U.S. Pat. No. 7,656,870, filed on Mar. 15, 2005, and entitled SYSTEM AND METHOD FOR PEER-TO-PEER HYBRID COMMUNICATIONS; U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS; U.S. patent application Ser. No. 12/705,925, filed on Feb. 15, 2010, and entitled SYSTEM AND METHOD FOR STRATEGIC ROUTING IN A PEER-TO-PEER ENVIRONMENT; and U.S. patent application Ser. No. 12/728,024, filed on Mar. 19, 2010, and entitled SYSTEM AND METHOD FOR PROVIDING A VIRTUAL PEER-TO-PEER ENVIRONMENT.

BACKGROUND

Document sharing between devices typically relies on the ability of a device to open a document using an application that is present on the device. However, the device may not have a suitable application installed or such an application may not be available for that particular device. Accordingly, improvements are needed in sharing documents to address such issues.

BRIEF DESCRIPTION OF THE DRAWINGS

For a more complete understanding, reference is now made to the following description taken in conjunction with the accompanying Drawings in which:

FIG. 3 is a sequence diagram illustrating one embodiment of a process that may be executed within the environment of FIG. 1 to move to another page.

FIG. 4 is a sequence diagram illustrating one embodiment of a process that may be executed within the environment of FIG. 1 to move to another page.

FIG. 11 is a flow chart illustrating one embodiment of a method that may be executed by a communication device within the environment of FIG. 1 to edit a page and share the edited page.

FIG. 12 is a flow chart illustrating one embodiment of a method that may be executed by a communication device within the environment of FIG. 1 to receive an edited page from another communication device.

FIG. 14 is a simplified network diagram of one embodiment of a hybrid peer-to-peer system within which the communication devices of FIG. 1 or 13 may operate.

FIG. 15a illustrates one embodiment of an access server architecture that may be used within the system of FIG. 14.

FIG. 15c illustrates one embodiment of components within the endpoint architecture of FIG. 15b that may be used for cellular network connectivity.

DETAILED DESCRIPTION

Figure 1:
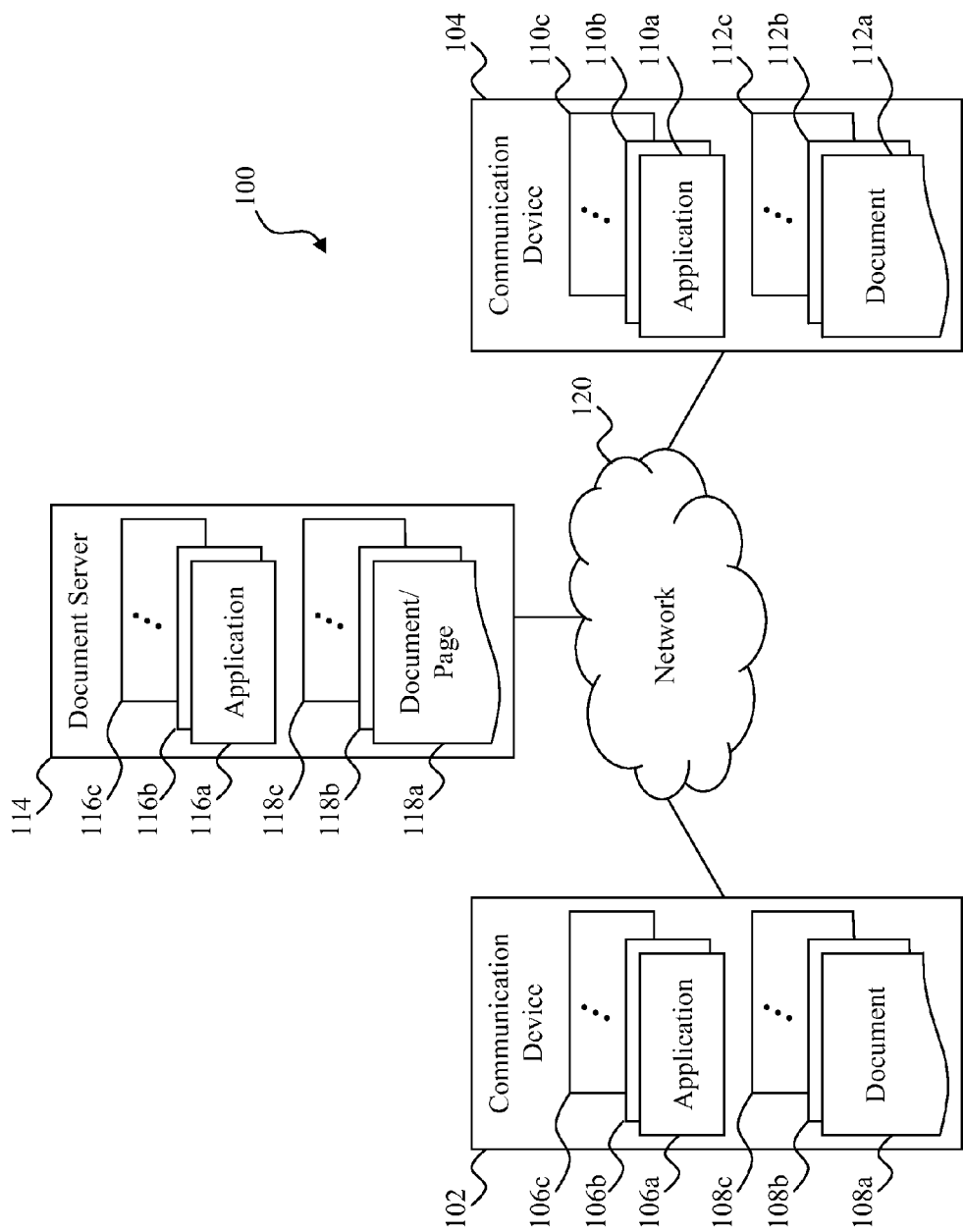
FIG. 1 is a simplified network diagram of one embodiment of an environment illustrating communication devices and a document server.

The present disclosure is directed to a system and method for document sharing between communication devices. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, an environment 100 is illustrated with two communication devices 102 and 104. Examples of such communication devices include cellular telephones (including smart phones), personal digital assistants (PDAs), netbooks, tablets, laptops, desktops, workstations, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications.

The communication device 102 includes multiple applications 106a-106c. The applications 106a-106c provide a user of the communication device 102 with the ability to interact with the communication device 102 in order to perform tasks in such areas as communication (e.g., voice and/or video calls, email, and text messaging), scheduling, games, photography, Internet access, and document viewing and/or manipulation. Document viewing and/or manipulation may be performed on various documents 108a-108c that are stored on or otherwise accessible to the communication device 102.

In the present example, a particular one of the applications 106a-106c may be associated with one or more document types of the documents 108a-108c. The term "document" as used herein includes any type of text, image, audio, and/or video file or combination of files, and may include files having multiple document types (e.g., an audio/video file or a text document with inline or linked images). A particular document 108a-108c generally has a document type associated with that document in the format of "document_name.document_type," so the document 108a may be in the format of document_108a.xyz, where .xyz is one of many different document types.

The characteristics of a particular document 108a-108c are dependent on various parameters of that document type. For example, a text document may have formatting parameters, such as font attributes (e.g., bold, underline, and italics), paragraph attributes, and other attributes. An audio document may have a bit rate, length, and other attributes. A video document may have a resolution, frame rate, and other attributes. A document that combines multiple document types may have parameters that represent the document types and/or may link to another document. Accordingly, each document 108a-108c may be associated with corresponding information that enables the communication device 102 to use one of the applications 106a-106c to display, play, view, or otherwise handle that document (all of which are represented herein for purposes of clarity by the term "display" regardless of the document type (e.g., playing an audio file is referred to herein as displaying the audio file)).

If a document 108a-108c is not associated with an application 106a-106c of the communication device 102, the document is not accessible to (e.g., cannot be opened by) the user of the communication device 102. For example, if the document 108a has a document type of .xyz (document_108a.xyz) and none of the applications 106a-106c on the communication device 102 are capable of reading and displaying the document type .xyz, the document 108a will not be available to the user even though it is present on the communication device 102.

An application may not be available on the communication device 102 for a number of reasons. One reason is that the application may not be supported on the communication device 102 (e.g., the application may use a proprietary document type and not be available for licensing on a particular operating system used by the communication device 102). Another reason is that the communication device 102 may have an operating system that does not provide access to certain functions needed by the application for security or other reasons and so the application may not be able to perform properly on that device even if available.

The communication device 104 includes applications 110a-110c that provide a user of the communication device 104 with the ability to interact with the communication device 104 in order to perform tasks in such areas as communication, scheduling, games, photography, Internet access, and document viewing and/or manipulation. Some or all of the applications 106a-106c and 110a-110c may be similar or identical. For example, the communication device 102 may include an application 106a that is also present in the applications 110a-110c of the communication device 104. In other embodiments, the communication devices 102 and 104 may perform a similar or identical function with a different application. For example, the communication device 102 may open an image document having a particular document type (e.g., a GIF file) with a particular application 106b, and the communication device 104 may open the same image document with another application 110c. The communication device 104 may also store or access a plurality of documents 112a-112c, each of which may have a document type that is associated with one or more of the applications 110a-110c as described with respect to the communication device 102.

In the present example, the user of the communication device 102 wants to share the document 108a with the user of the communication device 104. However, neither of the communication devices 102 and 104 is able to open the document. More specifically, the communication device 102 does not have an application 106a-106c capable of opening the document 108a of document type .xyz, and the communication device 104 does not have an application 110a-110c capable of opening the document 108a. For purposes of example, the term "open" means able to read and correctly display the document 108a on a display of the communication device, where a display is whatever input/output device is used for the document type (e.g., a display may be visual display such as a screen and/or an audio display such as speakers or a headset).

It is understood that the communication device 102 may send the document 108a to the communication device 104 even though one or both of the communication devices 102 and 104 cannot open the document 108a, but the sharing of the present example is a collaborative sharing where both users want to open the document 108a. For example, the users of the communication devices 102 and 104 may want to view the document 108a while discussing it and/or may want to edit the document. Sharing of the communication device 102 or 104 itself (e.g., giving control of the communication device to the other communication device) may not be possible and, even if possible, may not be desirable due to security concerns. For example, it may be undesirable to allow the communication device 104 to access the file system of the communication device 102 just to share a document, as any document on the communication device 102 may then be viewed by the communication device 104.

The environment 100 further includes a document server 114 that is coupled to the communication devices 102 and 104 via a network 120. The document server 114 includes applications 116a-116c that provide the document server 114 with functionality for managing connections (including communicating with the communication devices 102 and 104) and processing documents (as will be described below). In some embodiments, the document server 114 may also include one or more applications for storing documents and/or pages 118a-118c, either on the document server 114 or in another network accessible storage location (not shown). The documents/pages 118a-118c may be active (currently in use) or archived (stored and not currently in use).

The network 120 may be a single network or may represent multiple networks, including networks of different types. For example, the communication device 102 may be coupled to the document server 114 via a network that includes a cellular link coupled to a data packet network, and the communication device 104 may be coupled to the document server 114 via a data packet link such as a wide local area network (WLAN) coupled to a data packet network. Accordingly, many different network types and configurations may be used to couple the communication devices 102 and 104 to one another and to the document server 114.

Exemplary network, system, and connection types include the internet, WiMax, local area networks (LANs) (e.g., IEEE 802.11a and 802.11g wi-fi networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. Furthermore, the present disclosure may be used with communications systems such as Global System for Mobile communications (GSM) and/or code division multiple access (CDMA) communications systems. Connections to such networks may be wireless or may use a line (e.g., digital subscriber lines (DSL), cable lines, and fiber optic lines).

Communication among the communication device 102, communication device 104, and document server 114 may be accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)), and/or proprietary protocols. For example, signaling communications (e.g., session setup, management, and teardown) may use a protocol such as the Session Initiation Protocol (SIP), while data traffic may be communicated using a protocol such as the Real-time Transport Protocol (RTP), File Transfer Protocol (FTP), and/or Hyper-Text Transfer Protocol (HTTP). A sharing session and other communications as described herein may be connection-based (e.g., using a protocol such as the transmission control protocol/internet protocol (TCP/IP)) or connectionless (e.g., using a protocol such as the user datagram protocol (UDP)). While document sharing is occurring, it is understood that other communications may occur, including, but not limited to, voice calls, instant messages, audio and video, emails, and any other type of resource transfer, where a resource represents any digital data.

It is understood that the sequence diagrams described herein illustrate various exemplary functions and operations that may occur within various communication environments. It is understood that these diagrams are not exhaustive and that various steps may be excluded from the diagrams to clarify the aspect being described. For example, it is understood that some actions, such as network authentication processes and notifications, may have been performed prior to the first step of a sequence diagram by one or both of the communication devices 102 and 104. Such actions may depend on the particular type and configuration of each communication device 102 and 104, including how network access is obtained (e.g., cellular or WLAN access). Other actions may occur between illustrated steps or simultaneously with illustrated steps, including network messaging for call maintenance (including handoffs), communications with other devices (e.g., email, text messages, and/or voice calls (including conference calls)), and similar actions.

Figure 2:
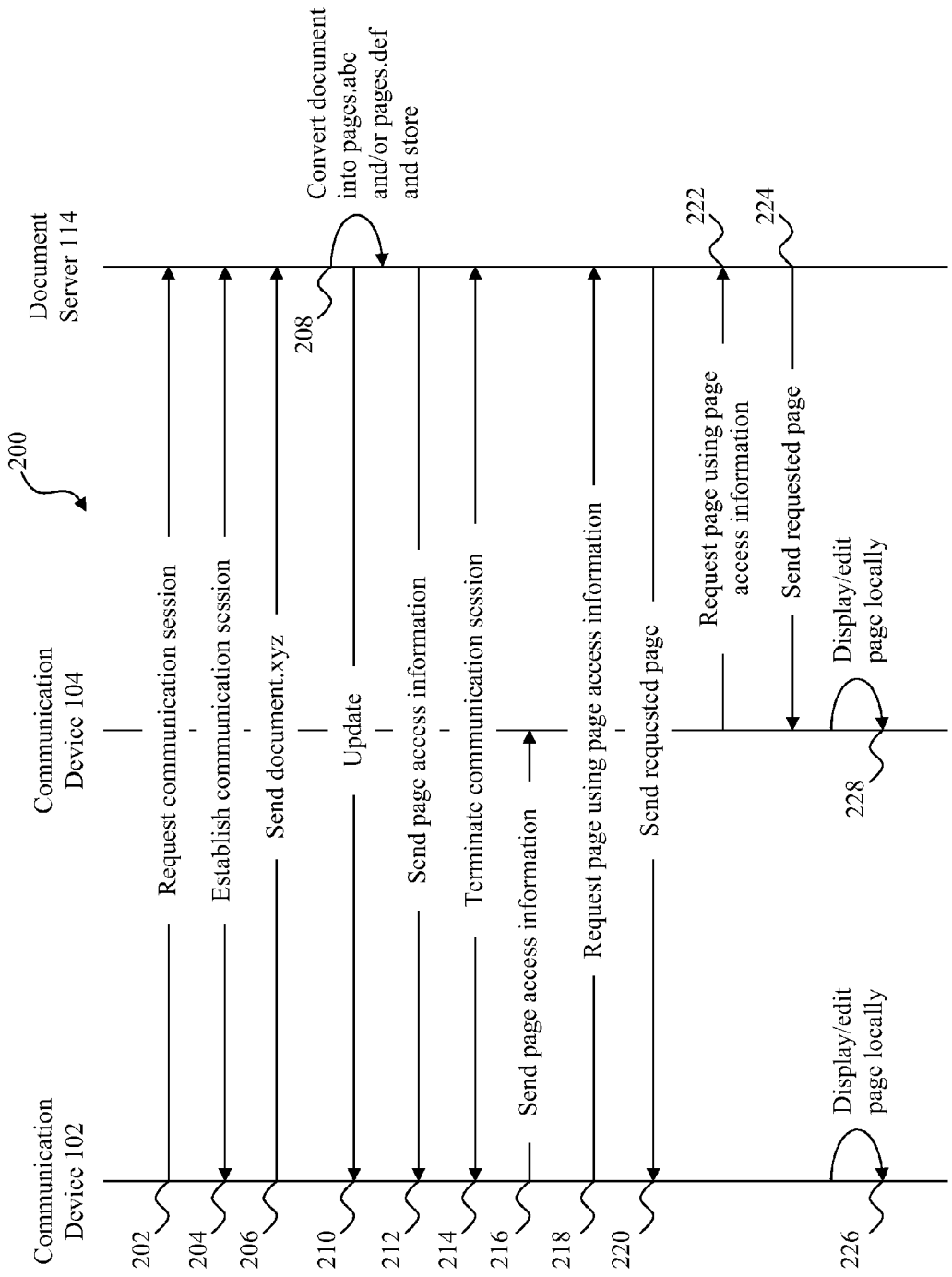
FIG. 2 is a sequence diagram illustrating one embodiment of a process that may be executed within the environment of FIG. 1 for sharing a document that cannot be opened by the communication devices.

Referring to FIG. 2, a sequence diagram illustrates one embodiment of a message sequence 200 that may occur in the environment of FIG. 1 to share a document such as the document 108a having a document type of .xyz (e.g., document_108a.xyz). Both the communication device 102 and the communication device 104 have applications that can open a document type .abc and a document type .def, but not the document type .xyz. A single application (e.g., the applications 106a and 110a) may open the document types .abc and .def on a single communication device 102 and 104, or separate applications may be used for the different document types (e.g., the applications 106a and 106b, and the applications 110a and 110b).

In step 202, the communication device 102 sends a request for a communication session to the document server 114. It is understood that the actual format of the request depends on the configuration of the communication device 102 and the document server 114. In step 204, the communication device 102 and the document server 114 establish the communication session. In step 206, the communication device 102 sends the document 108a.xyz to the document server 114. The communication device 102 also sends information to the document server 114 about the document_108a.xyz. Some or all of the information may be sent in the request of step 202 or in one or more separate messages. The information may include information about the document_108a.xyz itself and information to be used in converting the document.

The information about the document_108a.xyz may include parameters such as document type, number of pages if applicable, and size. The information to be used in converting the document may include a desired document type, a desired resolution, and whether the document is to be only viewable or both viewable and editable. The functional parameters of view only or view/edit may determine which document types are available for conversion. For example, a view only document may be converted to images, while a view/edit document may be converted to a document type that is commonly available. In the present example, the document types available for conversion are generally standards compliant so that viewers/editors are readily available. Furthermore, being standards compliant makes conversion of the document back into the .xyz document type or other documents types more readily available as an option. Being standards compliant may also provide additional portability of the document since more devices may be able to view the document without the need for additional conversions.

As stated previously, the communication devices 102 and 104 can both open .abc and .def document types. For purposes of example, .abc and .def are both standards compliant document types and so it is likely that both of the communication devices 102 and 104 either have this functionality or can obtain such functionality (e.g., by downloading an application).

The document type into which the document_108a.xyz is to be converted may be selected in various ways. One way is that the communication device 102 can tell the document server 114 what document types are available on the communication device 102. The document server 114 may then select a document type based on one or more defined criteria, such as which document types are most commonly used. Commonly used may be based on information such as what document types are most commonly requested by the particular communication device 102 or the operating system used by the communication device 102 and similar devices, or as generally requested from the document server 114 by all communication devices. Another way is for the communication device 102 to select a conversion option from the document server 114. For example, the document server 114 may provide a list of available document types to the communication device 102 (e.g., either based on the document types supported by the communication device 102 or simply a list of all document types supported by the server) and the communication device 102 may inform the document server 114 which document type to use for the conversion. The communication device 102 and document server 114 may communicate to determine what document types are available and then automatically select the conversion document type or provide a list of options (if available) to the user of the communication device 102.

Selection of view only or view/edit may modify the available options. For example, view only may result in the selection of a document type that produces images, while view/edit may result in the selection of a document type that allows easier editing. Examples of view only document types include .gif, .jpg, .png, and similar image document types. Examples of view/edit document types include .txt, .html, .pdf, and other document types that are generally more easily edited than an image file. However, it is understood that overlap between view only and view/edit document types may occur such as when, for example, an image file is edited.

In step 208, the document server 114 converts the document 108a. In the present example, document_108a.xyz is to be converted into view/edit document type .abc and has multiple pages in its native format of .xyz. The document server 114 converts the document_108a.xyz into multiple pages 118a-118c of document type .abc. There may not be a one-to-one correspondence between pages of the document_108a.xyz in its native format and the pages 118a-118c depending on the parameters used in the conversion. For example, if the document_108a.xyz is to be converted into a resolution of 768×1024 for display on the communication devices 102 and 104, each page 118a-118c may contain more or less information than a page of the document_108a.xyz. Accordingly, the number of pages 118a-118c may vary for the same document_108a.xyz depending on the parameters used for conversion.

In the present example, the document server 114 stores each page 118a-118c in an individually accessible manner. For example, each page 118a-118c may be stored as a separate file on the document server 114 or in another network accessible storage location (not shown) and may be accessed using a path (e.g., a network address ending in the page name). In other embodiments, the pages 118a-118c may be stored in a single file and accessed by the document server 114 as requested. For example, a request may be received for page 118b, and the document server 114 may then extract that page from the file and respond to the request.

In step 210, the document server 114 may send one or more updates to the communication device 102. The update, which may not be sent in some embodiments, may be used to notify the communication device 102 that the conversion process is occurring. Multiple updates may be sent to notify the communication device 102 of the progress of the conversion process. For example, separate updates may be sent to indicate that the conversion process is twenty-five percent complete, fifty percent complete, and seventy-five percent complete.

In step 212, the document server 114 sends access information for one or more of the pages 118a-118c to the communication device 102. For example, the document server 114 may send one or more links to the communication device 102 where each link represents a network address that may be used to access the pages 118a-118c. Depending on the configuration of the document server 114 and/or the particular request, the document server 114 may send a single link (e.g., a link to the first page 118a), may send multiple links (e.g., a link to each of the pages 118a-118c), or may send other information (e.g., a link to a single page with information that enables the document server 114 to extract another desired page). In other embodiments, the document server 114 may send a base path and an index or other information that provides the communication device 102 with instructions needed to access each of the pages 118a-118c. For example, the base path may indicate the path to a directory and the index may provide a list of page names or a range of page numbers. The communication device 102 may then append a page name or number to the base path in order to access a particular page. The document server 114 may also send other information to the communication device 102 such as the converted document type (e.g., .abc), the number of pages 118a-118c, the resolution of the pages 118a-118c, and/or a document identifier (ID).

In the present embodiment, in step 214, the communication device 102 and the document server 114 terminate the communication session established in step 204 after the page access information is sent to the communication device 102. Depending on the configuration of the communication device 102 and document server 114, the termination may be initiated by either the communication device 102 and/or the document server 114. In other embodiments, the communication session may remain open for later page transfers.

In step 216, the communication device 102 sends some or all of the page access information to the communication device 104. For example, if the communication device 102 received an index of pages 118a-118c from the document server 114, the communication device 102 may send a link to a single page (e.g., page_118a.abc) to the communication device 104. Alternatively, the communication device 102 may send a base path and a page identifier (e.g., a name or number) or an index of pages 118a-118b to the communication device 104.

The communication device 102 may also send additional information, such as an instruction that the communication device 104 retrieve a particular page or simply whatever page is represented by the link (e.g., page_118a.abc). The instruction may be a request that must be approved by the user of the communication device 104 or may be a command that causes the communication device 104 to automatically select the referenced page_118a.abc. The communication device 102 may also send information to the communication device 104 such as a document and/or page prefix (e.g., document_108a and/or page_118a), the number of pages, and a mode type (e.g., view only or view/edit). In step 218, the communication device 102 requests the page_118a.abc from the document server 114 and, in step 220, the document server 114 sends the requested page_118a.abc to the communication device 102. In step 222, the communication device 104 requests the same page_118a.abc from the document server 114 and, in step 224, the document server 114 sends the requested page_118a.abc to the communication device 104.

As represented in steps 226 and 228, respectively, the communication devices 102 and 104 may both display a portion of the document 108a.xyz as represented by page_118a.abc. As will be described below, the communication devices 102 and 104 may move between the pages 118a-118c, edit the pages 118a-118c, save edited pages, and otherwise view and manipulate the pages 118a-118c even though neither of the communication devices 102 and 104 can open the original document_108a.xyz.

In some embodiments, the document server 114 may provide different document types for each of the communication devices 102 and 104. For example, if the communication device 102 is able to open documents of document type .abc but not document type .def, and the communication device 104 is able to open documents of document type .def but not document type .abc, the document server 114 may provide pages_118a.abc-page_118c.abc and pages_118a.def-page_118c.def. In such embodiments, the communication device 102 may send the document prefix of document_108a to the communication device 104, and the communication device 104 may request the appropriate document type from the document server 114. With information such as the display resolution of the communication devices 102 and 104, the document server 114 may create pages that contain the same information even though the document types are different. In other embodiments, the communication devices 102 and 104 may compensate based on information from the server. In still other embodiments, the document server 114 may communicate with one or both of the communication devices 102 and 104 and/or the communication devices 102 and 104 may communicate with each other to select page parameters.

It is understood that the communication device 102 and 104 may also be coupled via text chat, voice, video with voice, and/or other call types. For example, the users of the communication devices 102 and 104 may be involved in a voice call, and may then share the pages representing the document_108*a*.xyz for viewing and/or editing while still engaged in the voice call. The users may also audibly relay document locations (e.g., "turn to page 6"), at which time the other user may then instruct the corresponding communication device to select that location.

It is understood that variations may exist in the order of steps in the sequence 200. For example, the communication device 102 may retrieve the page_118*a*.abc before notifying the communication device 104 to retrieve the page (i.e., step 218 may occur before step 216).

Referring to FIG. 3, a sequence diagram illustrates one embodiment of a message sequence 300 that may occur in the environment of FIG. 1 to select another page for viewing/editing by the communication devices 102 and 104. In the present example, the communication device 104 only has address information for the page currently being viewed, but not for pages that have not yet been viewed.

In step 302, the communication device 102 sends access information for another page (e.g., page_118*b*.abc) to the communication device 104. The page_118*b*.abc has not yet been accessed by the communication device 104 and has not been retrieved from the document server 114 by either of the communication devices 102 and 104. The message of step 302 or a later message (not shown) may include a request that must be approved by the user of the communication device 104 or may be an instruction that causes the communication device 104 to automatically select the referenced page_118*b*.abc.

In step 304, the communication device 102 requests the page_118*b*.abc from the document server 114 and, in step 306, the document server 114 sends the requested page_118*b*.abc to the communication device 102. In step 308, the communication device 104 requests the same page_118*b*.abc from the document server 114 and, in step 310, the document server 114 sends the requested page_118*b*.abc to the communication device 104. As represented in steps 312 and 314, respectively, the communication devices 102 and 104 may both display page_118*b*.abc.

It is understood that variations may exist in the order of steps in the sequence 300. For example, the communication device 102 may retrieve the page_118*b*.abc before notifying the communication device 104 to retrieve the page (i.e., step 304 may occur before step 302). In some embodiments, the sequence 300 may be used for any page other than the currently viewed page. In other embodiments, the sequence 300 may be used for new (not yet viewed) pages and/or pages that are no longer cached if caching is performed.

Referring to FIG. 4, a sequence diagram illustrates another embodiment of a message sequence 400 that may occur in the environment of FIG. 1 to select another page for viewing/editing by the communication device 102. In the present example, the communication devices 102 and 104 store some or all previously viewed pages in memory. For example, the communication devices 102 and 104 may store the previous page or a previous number of pages (e.g., based on page count or an available amount of memory in the communication device).

In step 402, while viewing page_118*b*.abc, the communication device 102 sends a page identifier for another page (e.g., page_118*a*.abc) to the communication device 104. The page_118*a*.abc has been previously retrieved from the document server 114 by both of the communication devices 102 and 104. The message of step 402 or a later message (not shown) may include a request that must be approved by the user of the communication device 104 or may be an instruction that causes the communication device 104 to automatically select the referenced page_118*a*.abc. In steps 404 and 406, respectively, the communication devices 102 and 104 retrieve page_118*a*.abc from memory. As represented in steps 408 and 410, respectively, the communication devices 102 and 104 may both display page_118*a*.abc.

It is understood that the sequences 300 and 400 may be combined depending on whether a page has expired (e.g., is no longer cached for a communication device) or other parameters. For example, one of the communication devices 102 and 104 may retrieve the page from memory while the other communication device retrieves the page from the document server 114. The page identifier of step 402 may be a similar or identical message to that of step 302 of FIG. 3, and the communication device 104 may determine whether the page is cached before retrieving the page. The message sent from the communication device 102 to the communication device 104 may contain a flag or other indicator to notify the communication device 104 that the page has been previously viewed.

Figure 5:
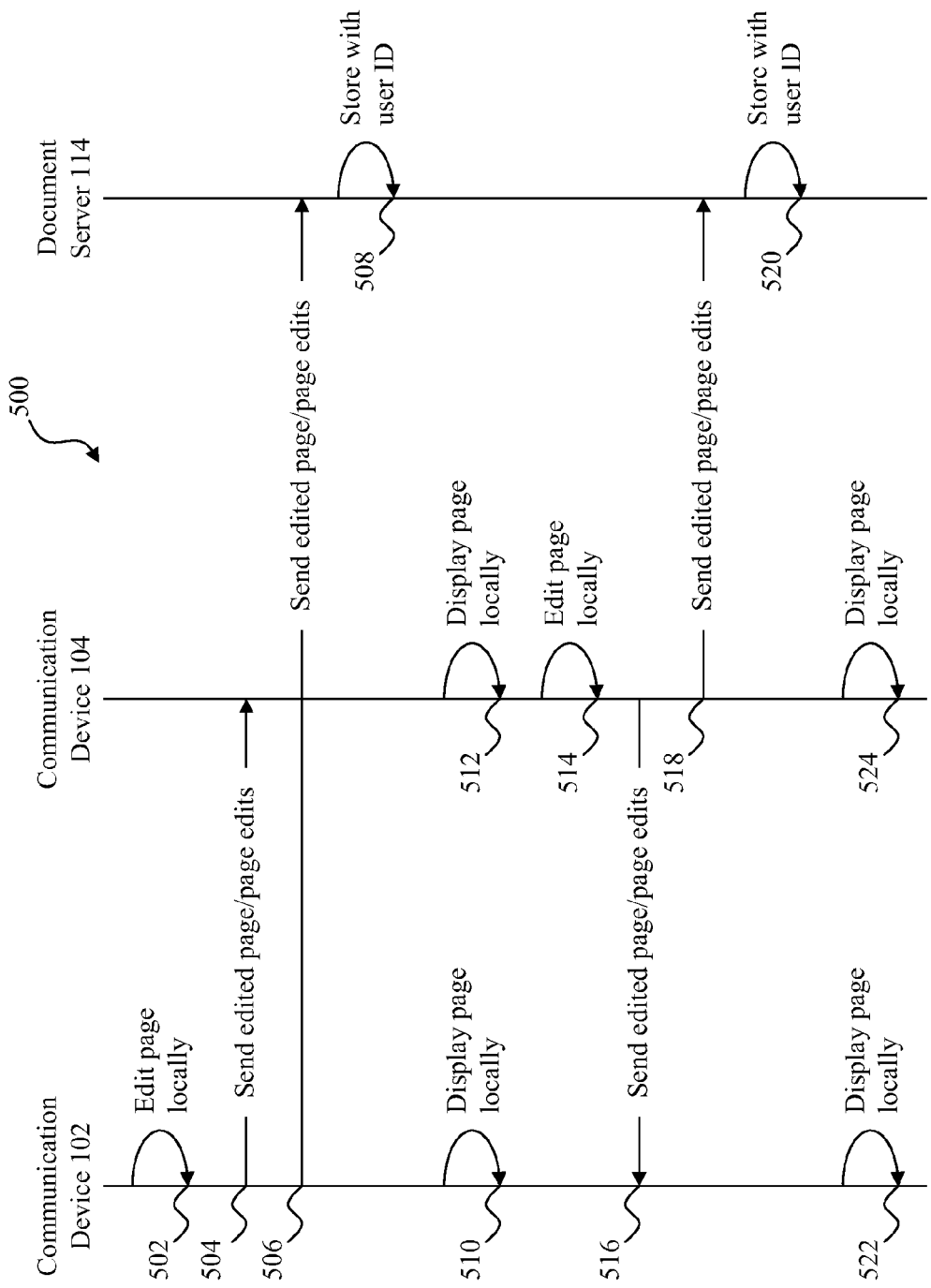
FIG. 5 is a sequence diagram illustrating one embodiment of a process that may be executed within the environment of FIG. 1 to share and save edits to a page.

Referring to FIG. 5, a sequence diagram illustrates one embodiment of a message sequence 500 that may occur in the environment of FIG. 1 when a page is edited. In the present example, both of the communication devices 102 and 104 may edit the page being viewed and the edits may be local only, may be sent to the other device, and/or may be sent to the document server 114.

In step 502, the communication device 102 edits the current page (e.g., page_118*a*.abc). For example, if the page_118*a*.abc is of document type .html or .pdf, the communication device 102 may be used to edit text and attributes of the page_118*a*.abc, as well as perform markups and other edits. If the page_118*a*.abc is an image file, the edits are limited to those possible with images. It is understood that the possible edits depend on the document type and the applications available on the communication device 102.

In step 504, the edited page or page edits may be sent to the communication device 104. In some embodiments, the entire page with edits may be sent. In other embodiments, only edits may be sent and the communication device 104 may then apply those edits to its local version of page_118*a*.abc. In step 506, the communication device 102 may send the edited page or page edits to the document server 114. The document server 114 may then store the edited page with a user ID to indicate who made the edits. For example, the document server 114 may store the page_118*a*.abc as page_118*a*.abc.user1 and save the revised page separately from the original page_118*a*.abc. This enables the document server 114 to provide a revision history and to retrieve earlier document versions. As represented in steps 510 and 512, respectively, the communication devices 102 and 104 may both display the edited page_118*a*.abc. It is understood that the communication device 104 may also provide an alternate page view to display current local edits made by the communication device 104 but not yet sent to the communication device 102 or document server 114 in some embodiments.

In step 514, the communication device 104 edits the current page (e.g., page_118*a*.abc) as described with respect to step 502 for the communication device 102. As with the communication device 102, the possible edits depend on the document type and the applications available on the communication device 104. In step 516, the edited page or page edits may be sent to the communication device 102. In some embodiments, the entire page with edits may be sent. In other embodiments, only edits may be sent and the communication device 102 may then apply those edits to the page_118*a*.abc. In step 518, the communication device 104 may send the edited page or page edits to the document server 114. The document server 114 may then store the edited page with a user ID to indicate who made the edits. For example, the document server 114 may store the page_118*a*.abc as page_118*a*.abc.user2 and save the revised page separately from the original page_118*a*.abc.

As represented in steps 522 and 524, respectively, the communication devices 102 and 104 may both display the edited page_118*a*.abc. It is understood that the communication device 102 may also provide an alternate page view to display current local edits made by the communication device 102 but not yet sent to the communication device 104 or document server 114 in some embodiments.

Figure 6:
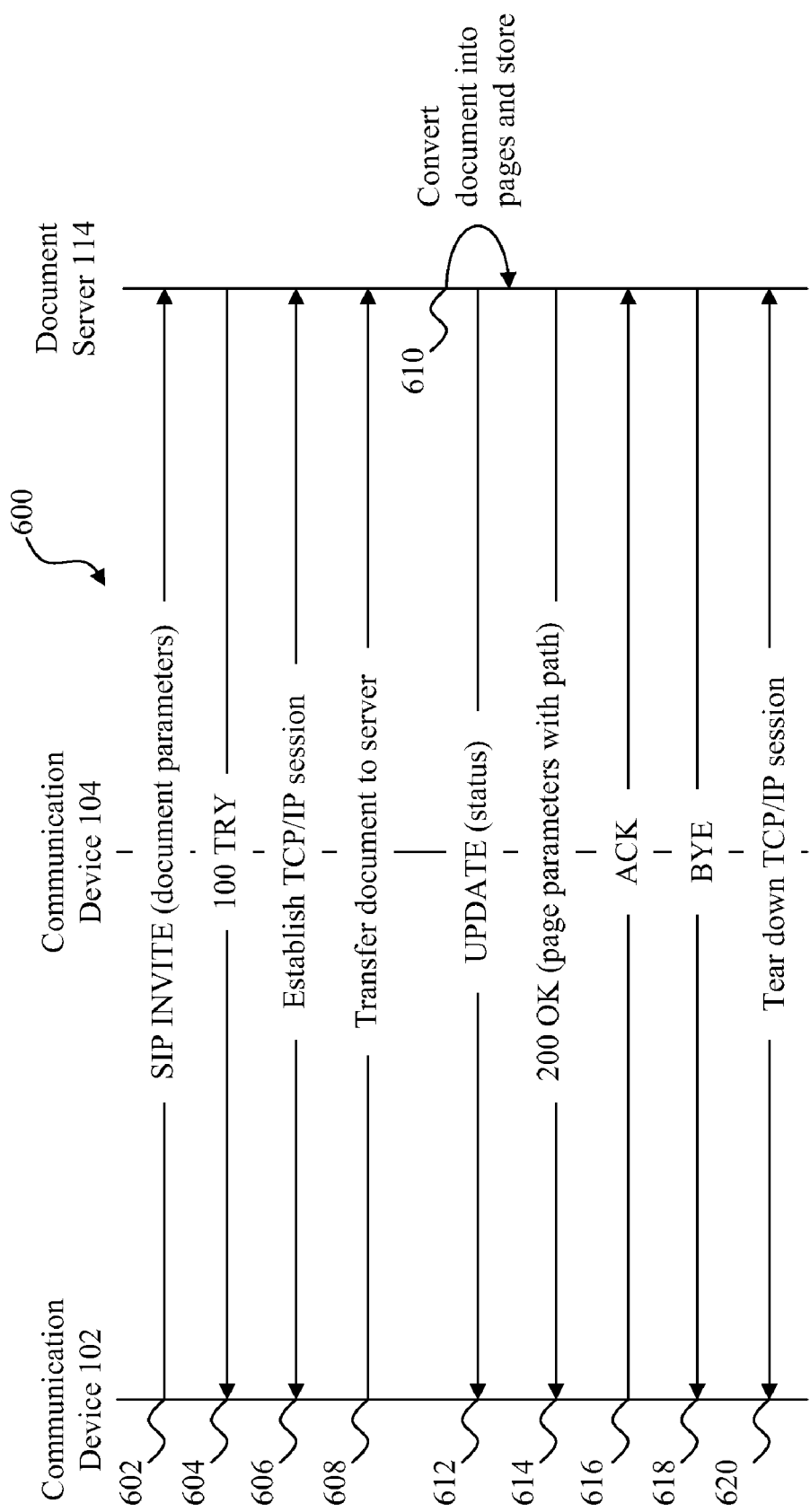
FIG. 6 is a sequence diagram illustrating one embodiment of a process that may be executed within the environment of FIG. 1 for processing a document to be shared by a communication device.

Referring to FIG. 6, a sequence diagram illustrates one embodiment of a message sequence 600 that may occur in the environment of FIG. 1 to process a document (e.g., the document_108*a*.xyz) to be shared by the communication device 102. FIG. 6 illustrates, for example, a more specific embodiment of steps 202-214 of FIG. 2 using SIP for signaling and TCP/IP for document transfer. In some embodiments, the communication devices 102 and 104 in the present example may be endpoints in a peer-to-peer network as described below with respect to FIG. 14.

In step 602, the communication device 102 sends a SIP INVITE message to the document server 114 containing document parameters as previously described. For example, the SIP INVITE may contain a request for document conversion (e.g., Content_Type=application/document-conversion, Content_Length=0) and other parameters, such as a desired resolution for converted pages. It is understood that this information need not be in the INVITE message, but may be contained in other SIP signaling messages, such as INFO messages. In step 604, the document server 114 returns a 100 TRY. In step 606, the communication device 102 and the document server 114 establish a TCP/IP communication session, which is used in step 608 to transfer the document_108*a*.xyz from the communication device 102 to the document server 114. In step 610, the document server 114 processes the document_108*a*.xyz into pages (e.g., page_118*a*.abc-page_108*c*.abc) as previously described. During step 612, SIP UPDATE (or INFO) messages may be sent from the document server 114 to the communication device 102 to notify the communication device 102 that the document processing is underway and/or to provide status updates, such a percentage of the processing completed.

In step 614, once the processing in completed, the document server 114 sends a 200 OK to the communication device 102 with the page information as previously described (e.g., path, number of pages, and document type). In step 616, the communication device 102 responds to the 200 OK of step 614 with an ACK, and the document server 114 sends a BYE to the communication device 102 in step 618. In step 620, the communication device 102 and document server 114 may tear down the TCP/IP session.

Figure 7:
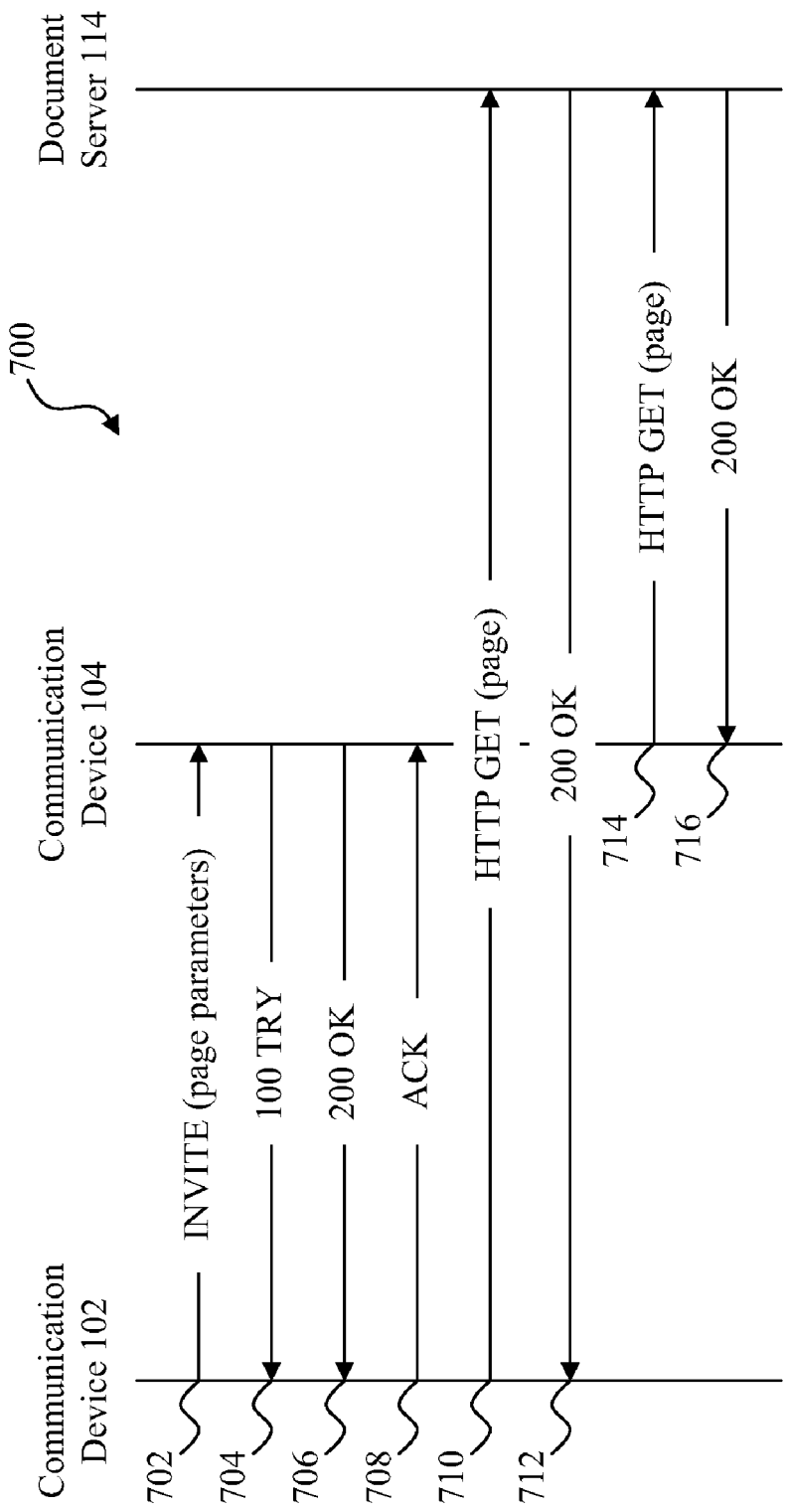
FIG. 7 is a sequence diagram illustrating one embodiment of a process that may be executed within the environment of FIG. 1 to share a page between communication devices.

Referring to FIG. 7, a sequence diagram illustrates one embodiment of a message sequence 700 that may occur in the environment of FIG. 1 to share a page (e.g., the page_118*a*.abc) between the communication device 102 and the communication device 104. FIG. 7 illustrates, for example, using SIP signaling to set up a communication session for document sharing between the communication devices 102 and 104 in a more specific embodiment of step 216 of FIG. 2, as well as a more specific embodiment of steps 218-224 of FIG. 2 using HTTP for page retrieval. In some embodiments, the communication devices 102 and 104 in the present example may be endpoints in a peer-to-peer network as described below with respect to FIG. 14.

In step 702, the communication device 102 sends a SIP INVITE to the communication device 104 to set up a document sharing session. The INVITE contains page parameters to be used for document sharing as previously described. In step 704, the communication device 104 returns a 100 TRY and, in step 706, returns a 200 OK to indicate that it is prepared for the document sharing session. In step 708, the communication device 102 sends an ACK to the communication device 104. In step 710, the communication device 102 sends an HTTP GET call to the document server 114 with parameters identifying the page to be retrieved. In step 712, the document server 114 sends a 200 OK with page_118*a*.abc to the communication device 102. In step 714, the communication device 104 sends an HTTP GET call to the document server 114 with parameters identifying the page to be retrieved. In step 716, the document server 114 sends a 200 OK with page_118*a*.abc to the communication device 104.

It is understood that variations may exist in the order of steps in the sequence 700. For example, the communication device 102 may retrieve the page_118*a*.abc before notifying the communication device 104 to retrieve the page (e.g., step 710 may occur before step 702).

Figure 8:
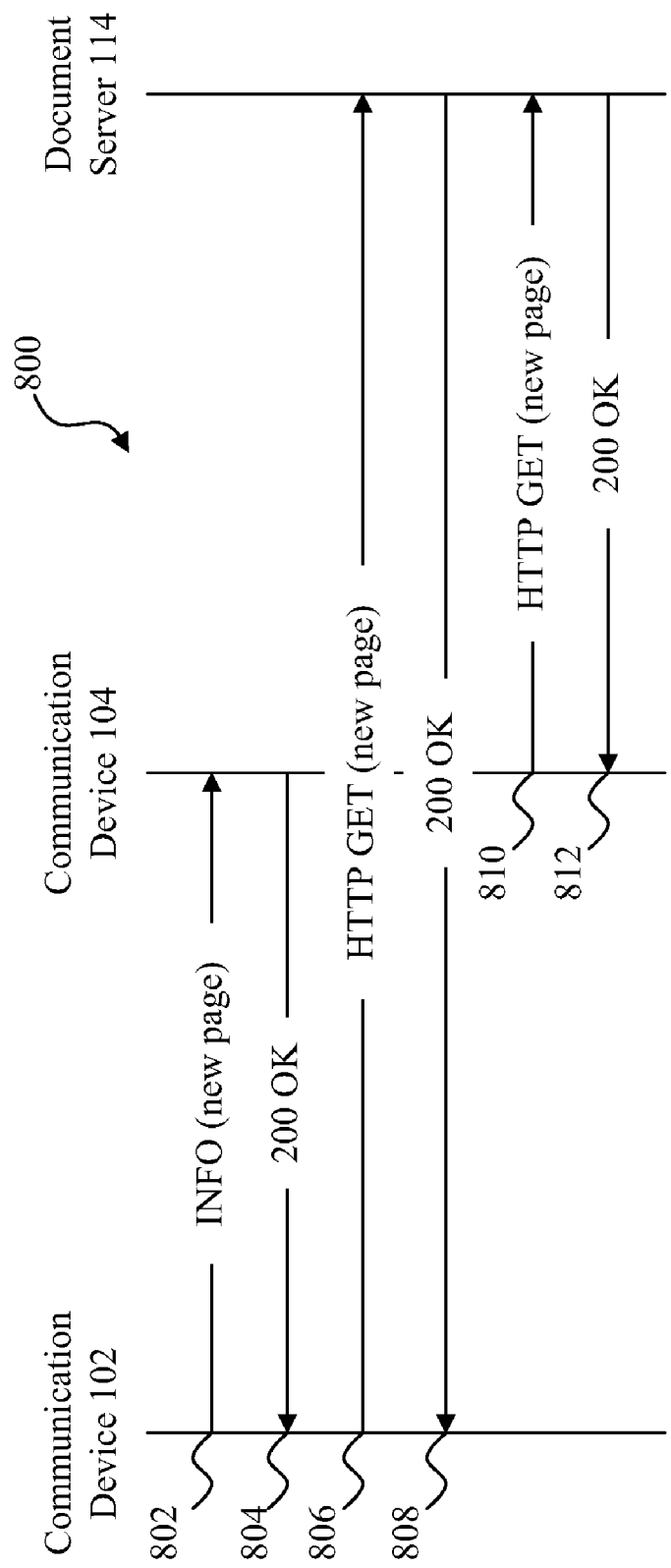
FIG. 8 is a sequence diagram illustrating one embodiment of a process that may be executed within the environment of FIG. 1 to move to another page.

Referring to FIG. 8, a sequence diagram illustrates one embodiment of a message sequence 800 that may occur in the environment of FIG. 1 to share a new page between the communication device 102 and the communication device 104. FIG. 8 illustrates, for example, a more specific embodiment of steps 302-310 of FIG. 3 using SIP signaling and HTTP for page retrieval. In some embodiments, the communication devices 102 and 104 in the present example may be endpoints in a peer-to-peer network as described below with respect to FIG. 14.

In step 802, the communication device 102 sends a SIP INFO (or UPDATE) message to the communication device 104 to indicate that the communication device 104 should display another page (e.g., page_118*b*.abc). The INFO message contains page parameters to be used for retrieving the new page as previously described. In step 704, the communication device 104 returns a 200 OK to acknowledge the INFO message. In step 806, the communication device 102 sends an HTTP GET call to the document server 114 with parameters identifying the new page to be retrieved. In step 808, the document server 114 sends a 200 OK with the page_118*b*.abc to the communication device 102. In step 810, the communication device 104 sends an HTTP GET call to the document server 114 with parameters identifying the new page to be retrieved. In step 812, the document server 114 sends a 200 OK with the page_118*b*.abc to the communication device 104.

It is understood that variations may exist in the order of steps in the sequence 800. For example, the communication device 102 may retrieve the page_118*b*.abc before notifying the communication device 104 to retrieve the page (e.g., step 806 may occur before step 802).

Figure 9:
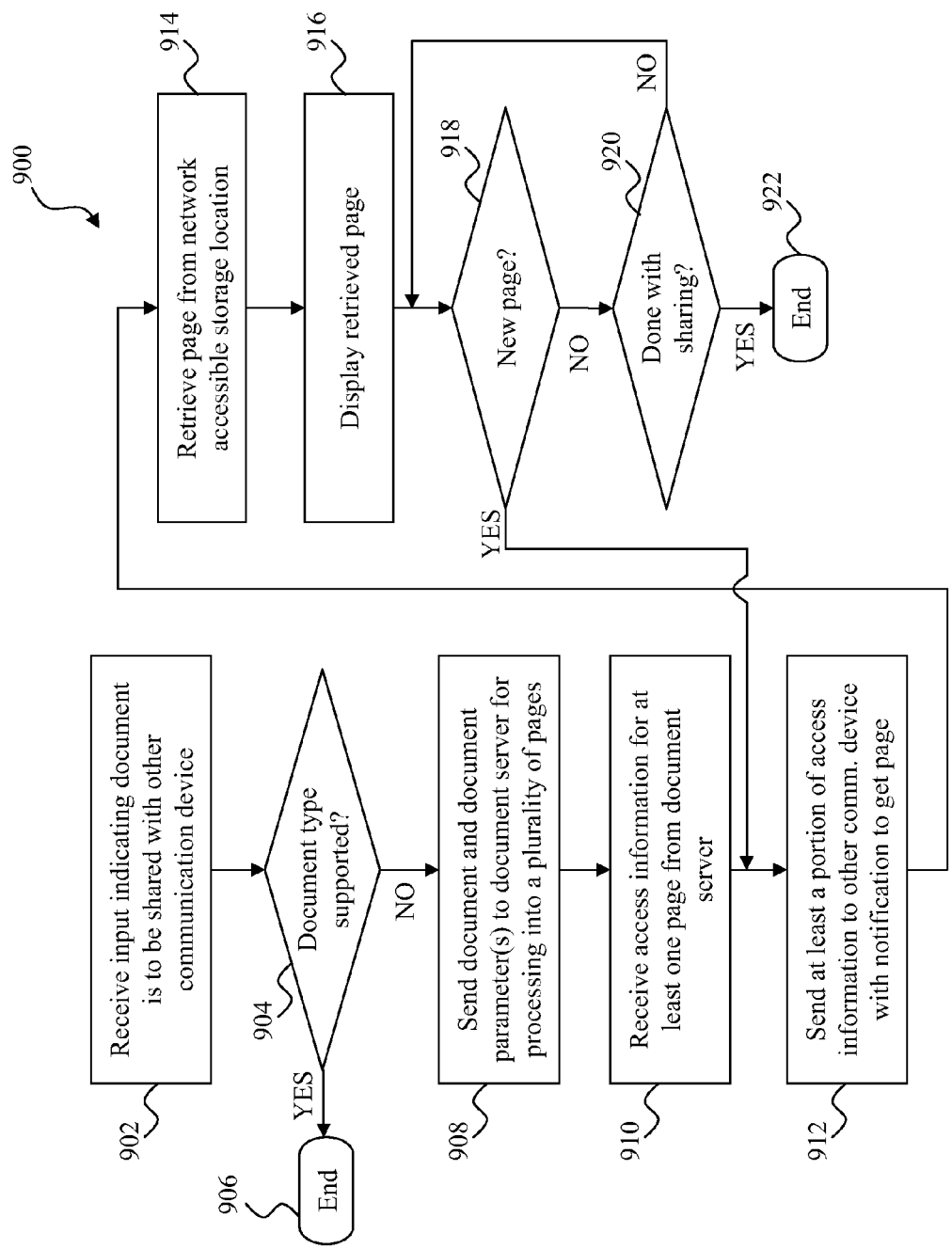
FIG. 9 is a flow chart illustrating one embodiment of a method that may be executed by a communication device within the environment of FIG. 1 to share a document with another communication device.

Referring to FIG. 9, a flow chart illustrates one embodiment of a method 900 showing how a communication device (e.g., the communication device 102 of FIG. 1) may share a document with another communication device (e.g., the communication device 104 of FIG. 1). The method 900 uses a document server (e.g., the document server 114 of FIG. 1) and a network accessible storage location, which may be the document server 114 in some embodiments.

In step 902, the communication device 102 receives input indicating that a document (e.g., the document_108*a*.xyz) on the communication device 102 is to be shared with the communication device 104. In step 904, a determination is made as to whether the document type of document_108*a*.xyz is supported by the communication device 102. If the document type is supported and the document_108*a*.xyz can be opened by the communication device 102 (e.g., one of the applications 106*a*-106*c* can open the document_108*a*), the method 900 moves to step 906 and ends. Although not shown, the document_108*a* may then be handled by the appropriate application 106*a*-106*c*. If step 904 determines that the communication device 102 does not have access to an application required for use of the document type .xyz, the method 900 moves to step 908.

In step 908, the communication device 102 sends the document_108*a*.xyz and one or more document parameters to the document server 114 for processing as described previously. The document server 114 processes the document_108*a*.xyz into multiple pages (e.g., page_118*a*.abc-page_118*c*.abc) based on the one or more document parameters. Each of the pages is a document type (e.g., document type .abc) that is different from the document type .xyz and is supported by an application present on the communication device 102.

In step 910, the communication device 102 receives access information for page_118*a*.abc from the document server 114, such as a network address that identifies a location of the page on the network accessible storage location. In step 912, the communication device 102 sends information representing at least one parameter of page_118*a*.abc and the network address of page_118*a*.abc to the communication device 104. Although not shown, it is understood that in some embodiments the communication device 102 may send a request to share the document_108*a*.xyz and/or the page_118*a*.abc and the communication device 104 may decline or accept the request. In step 914, the communication device 102 uses the network address to retrieve page_118*a*.abc from the network accessible storage location. In step 916, the communication device 102 displays page_118*a*.abc on a display that is coupled to or part of the communication device.

In step 918, a determination may be made as to whether another page (e.g., the page_118*b*.abc) is to be viewed. For example, additional input may be received by the communication device 102. If the determination indicates that another page is to be viewed, the method 900 returns to step 912. If the determination indicates that there is not currently another page to view, the method 900 continues displaying the current page and moves to step 920. In step 920, a determination may be made as to whether the sharing session is over. If it is, the method 900 moves to step 922 and ends. If the session is to continue, the method 900 returns to step 918.

It is understood that variations may exist in the order of steps in the method 900. For example, the communication device 102 may retrieve the page_118*a*.abc before notifying the communication device 104 to retrieve the page (e.g., step 914 may occur before step 912).

Figure 10:
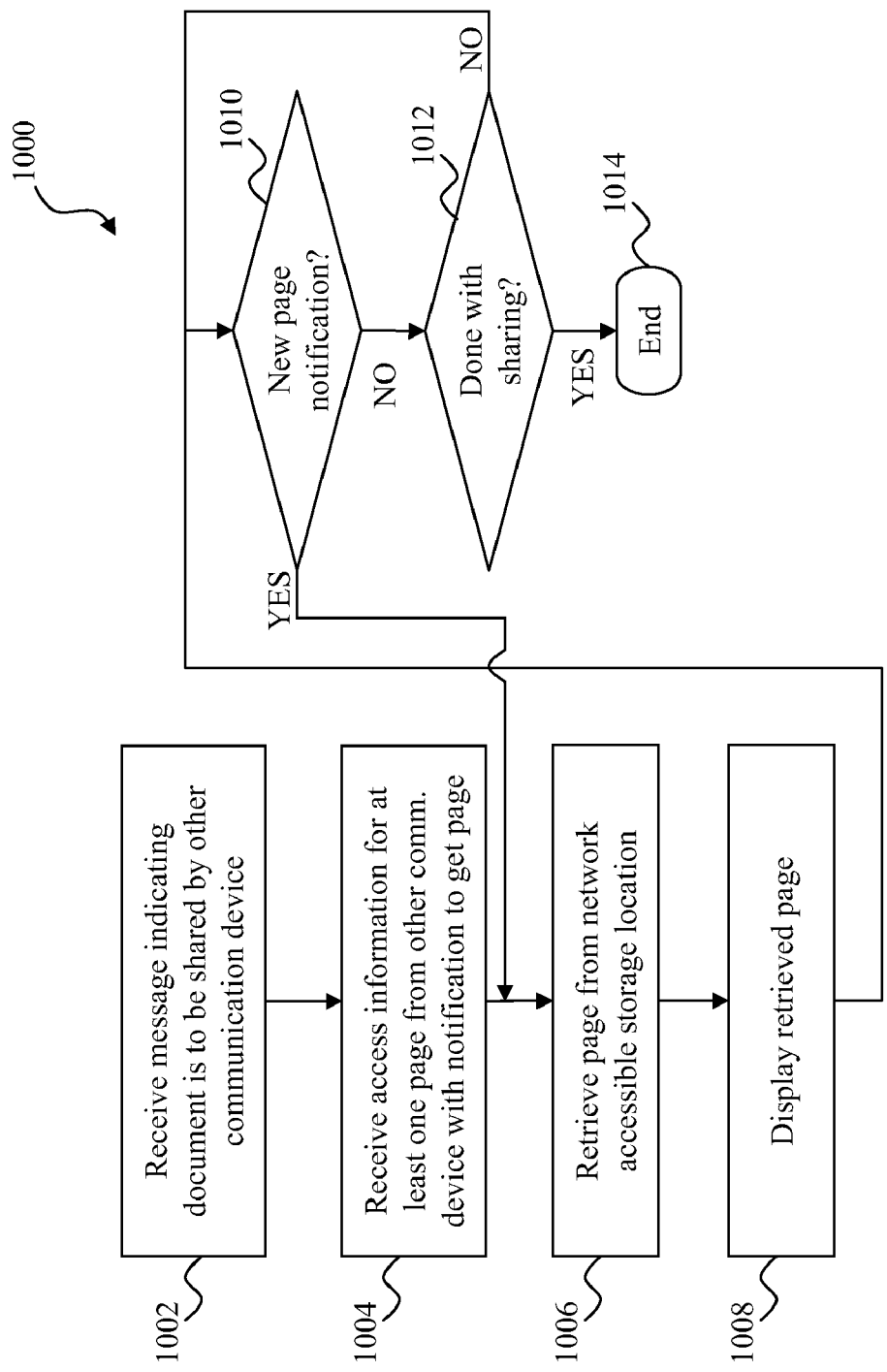
FIG. 10 is a flow chart illustrating one embodiment of a method that may be executed by a communication device within the environment of FIG. 1 to obtain pages representing a document being shared from another communication device.

Referring to FIG. 10, a flow chart illustrates one embodiment of a method 1000 showing how a communication device (e.g., the communication device 104 of FIG. 1) may obtain pages (e.g., page_118*a*.abc through page_118*c*.abc) representing a document (e.g., document_108*a*.xyz) to be shared from another communication device (e.g., the communication device 102 of FIG. 1). The method 1000 uses a document server (e.g., the document server 114 of FIG. 1) and a network accessible storage location, which may be the document server 114 in some embodiments.

In step 1000, the communication device 104 receives a message from the communication device 102. The message indicates that the communication device 102 is requesting to share a document with the communication device 104. Although not shown, it is understood that the communication device 104 may decline or accept the request in some embodiments. In step 1004, the communication device 104 receives access information for page_118*a*.abc from the communication device 102 as previously described. The communication device 104 may also receive a notification to get the page identified in the access information from the communication device 102.

In step 1006, the communication device 104 retrieves page_118*a*.a from the network accessible storage location and, in step 1008, displays page_118*a*.abc on a display that is coupled to or part of the communication device. In step 1010, a determination may be made as to whether another page (e.g., page_118*b*.abc) is to be viewed. For example, a determination may be made as to whether another page notification has been received from the communication device 102. If the determination indicates that another page (e.g., the page_118*b*.abc) is to be viewed, the method 1000 returns to step 1006. If the determination indicates that there is not currently another page to view, the method 1000 continues displaying the current page and moves to step 1012. In step 1012, a determination may be made as to whether the sharing session is over. If it is, the method 1000 moves to step 1014 and ends. If the session is to continue, the method 1000 returns to step 1010.

Referring to FIG. 11, a flow chart illustrates one embodiment of a method 1100 showing how a communication device (e.g., the communication device 102 or 104 of FIG. 1) may edit and share a page (e.g., the page_118*a*.abc) with another communication device (e.g., the other of the communication devices 102 or 104 of FIG. 1). It is understood that either communication device 102 or 104 may edit page_118*a*.abc and send the page to the other communication device. The sharing session in the present example does not limit editing to the communication device 102 that is sharing the document, nor does the session limit editing to a device that has control of the session (e.g., there is no "presenter" designation that is needed by a communication device to edit the document), although it is understood that these limitations may exist in some embodiments. Accordingly, while either communication device 102 or 104 can edit the page_118*a*.abc at any time during the session, the present example uses the communication device 102 as the communication device performing the edits. The method 1100 uses a document server (e.g., the document server 114 of FIG. 1) and a network accessible storage location, which may be the document server 114 in some embodiments.

In step 1102, the communication device 102 receives input to edit the currently displayed page_118*a*.abc and, in step 1104, performs and displays the edits. In step 1106, a determination is made as to whether to send the edited page or edits to the communication device 104. If not, the method 1100 moves to step 1110. If the edited page/edits are to be sent, the communication device 102 sends them to the communication device 104 in step 1108 and moves to step 1110. The sending step 1108 may update the page_118*a*.abc on the communication device 104 in real time. It is noted that the edited page/edits are not sent through the document server 114 in step 1108 or otherwise retrieved by the communication device 104 from the document server 114, but are sent from the communication device 102 to the communication device 104. In step 1110, a determination is made as to whether to send the edited page or edits to the document server 114 and/or the network accessible storage location. If not, the method 1100 moves to step 1114 and ends. If the edited page/edits are to be sent, the communication device 102 sends them to the document server 114 and/or the network accessible storage location in step 1112 before ending in step 1114.

It is understood that variations may exist in the order of steps in the method 900. For example, the communication device 102 may send the edited page_118*a*.abc to the document server 114 before sending it to the communication device 104 (e.g., steps 1110/1112 may occur before steps 1106/1108).

Referring to FIG. 12, a flow chart illustrates one embodiment of a method 1200 showing how a communication device (e.g., the communication device 102 or 104 of FIG. 1) may receive and display an edited page (e.g., page_118*a*.abc) from another communication device (e.g., the other of the communication devices 102 or 104 of FIG. 1). It is understood that either communication device 102 or 104 may receive the edited page_118*a*.abc from the other communication device. Accordingly, while either communication device 102 or 104 can edit the page_118*a*.abc at any time during the session and send it to the other communication device, the present example uses the communication device 104 as the communication device receiving the edits. In step 1202, the communication device 104 receives the edited page_118*a*.abc and, in step 1204, displays the edited page.

Figure 13:
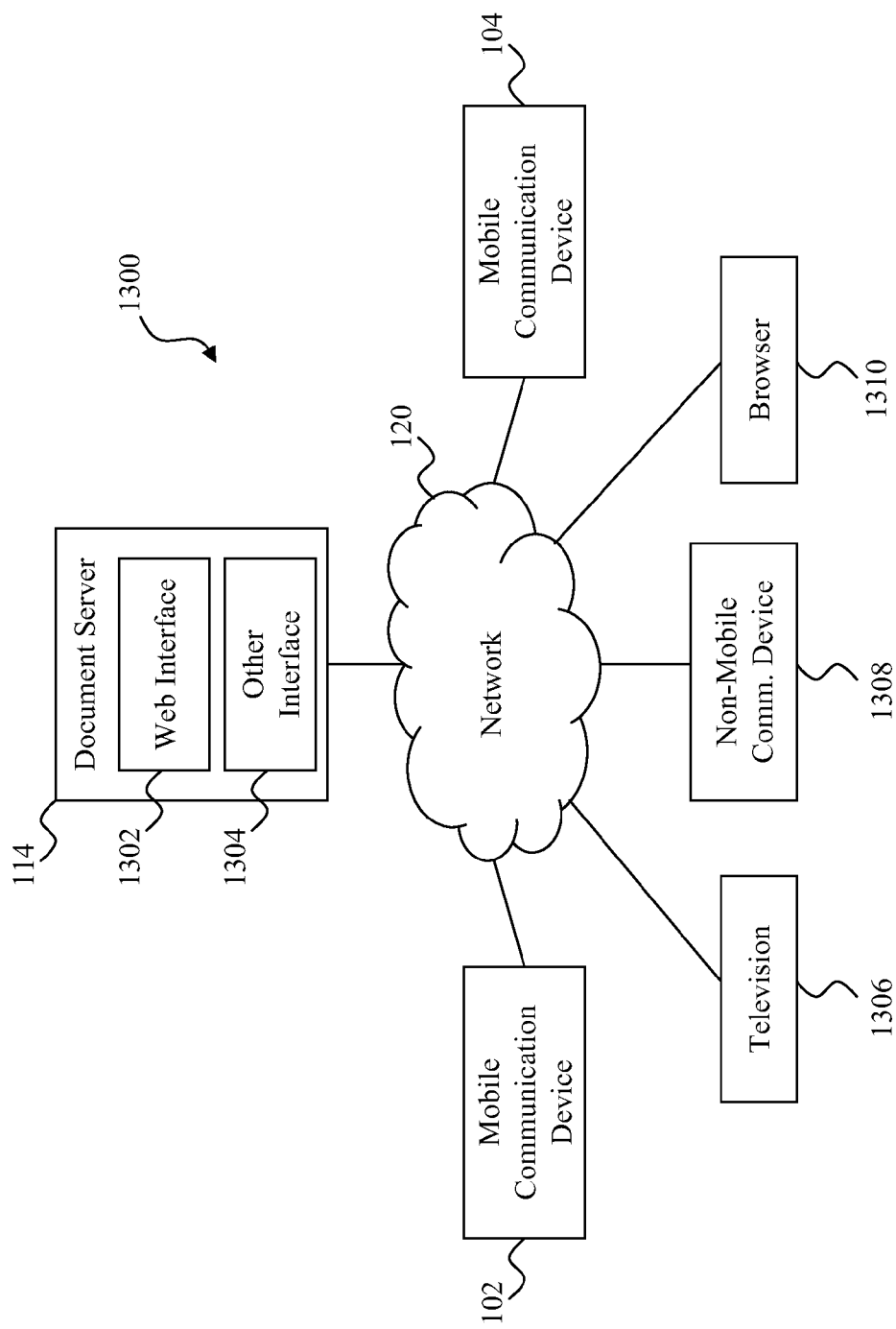
FIG. 13 is a simplified network diagram of one embodiment of an environment illustrating devices and a document server.

Referring to FIG. 13, in another embodiment, an environment 1300 is illustrated that may be similar to the environment 100 of FIG. 1 with the two communication devices 102 and 104 and the document server 114. In the present example, the document server 114 includes a web interface 1302 and another interface 1304, which may be any interface that can be used to couple the document server 114 to a networked device. For example, the web interface 1302 may be used to provide access to the documents/pages 118*a*-118*c* to a browser 1310, such as a web browser on a computing device. The other interface 1304 may be used to provide access to the documents/pages 118*a*-118*c* to a television 1306 or other non-communication device 1308, which may be any computing device. One example of the other interface 1304 is described in U.S. patent application Ser. No. 12/728,024, filed on Mar. 19, 2010, and entitled SYSTEM AND METHOD FOR PROVIDING A VIRTUAL PEER-TO-PEER ENVIRONMENT, which is hereby incorporated by reference in its entirety.

It is understood that the document server 114 may provide various document types of the original document_108*a*.xyz depending on the device that is requesting access. For example, the document_108*a*.xyz may be converted to .html pages for the browser 1310, and may be converted to a suitable television format for the television 1306. This enables devices other than the communication devices 102 and 104 to view the pages 118*a*-118*c* as viewed by the communication devices. In other embodiments, the other devices may also be able to edit the pages, view edited pages as stored on the document server 114, and/or save edits to the document server 114. In still other embodiments, the devices may be able to participate in direct sharing.

Referring to FIG. 14, one embodiment of a peer-to-peer hybrid system 1400 is illustrated. The system 1400 includes an access server 1402 that is coupled to endpoints 1404 and 1406 via a packet network 1408 that may form part or all of the network 120 of FIG. 1. In some embodiments, the endpoints 1404 and 1406 may represent peer-to-peer functionality present on the communication devices 102 and 104 of FIG. 1, and so the peer-to-peer architectures and functions described in this embodiment and following embodiments may be used with the preceding embodiments.

Communication between the access server 1402, endpoint 1404, and endpoint 1406 is accomplished using predefined and publicly available (i.e., non-proprietary) communication standards or protocols (e.g., those defined by the IETF or the ITU-T). For example, signaling communications (e.g., session setup, management, and teardown) may use a protocol such as SIP, while actual data traffic may be communicated using a protocol such as RTP. As will be seen in the following examples, the use of standard protocols for communication enables the endpoints 1404 and 1406 to communicate with any device that uses the same standards. The communications may include, but are not limited to, voice calls, instant messages, audio and video, emails, and any other type of resource transfer, where a resource represents any digital data. In the following description, media traffic is generally based on UDP, while authentication is based on the TCP/IP. However, it is understood that these are used for purposes of example and that other protocols may be used in addition to or instead of UDP and TCP/IP.

Connections between the access server 1402, endpoint 1404, and endpoint 1406 may include wireline and/or wireless communication channels. In the following description, it is understood that the term "direct" means that there is no endpoint or access server in the communication channel(s) between the endpoints 1404 and 1406, or between either endpoint and the access server. Accordingly, the access server 1402, endpoint 1404, and endpoint 1406 are directly connected even if other devices (e.g., routers, firewalls, and other network elements) are positioned between them. In addition, connections to endpoints, locations, or services may be subscription based, with an endpoint only having access if the endpoint has a current subscription. Furthermore, the following description may use the terms "user" and "endpoint" interchangeably, although it is understood that a user may be using any of a plurality of endpoints. Accordingly, if an endpoint logs in to the network, it is understood that the user is logging in via the endpoint and that the endpoint represents the user on the network using the user's identity.

The access server 1402 stores profile information for a user, a session table to track what users are currently online, and a routing table that matches the address of an endpoint to each online user. The profile information includes a "buddy list" for each user that identifies other users ("buddies") that have previously agreed to communicate with the user. Online users on the buddy list will show up when a user logs in, and buddies who log in later will directly notify the user that they are online (as described with respect to FIG. 4). The access server 1402 provides the relevant profile information and routing table to each of the endpoints 1404 and 1406 so that the endpoints can communicate directly with one another. Accordingly, in the present embodiment, one function of the access server 1402 is to serve as a storage location for information needed by an endpoint in order to communicate with other endpoints and as a temporary storage location for requests, voicemails, etc., as will be described later in greater detail.

With additional reference to FIG. 15a, one embodiment of an architecture 1500 for the access server 1402 of FIG. 14 is illustrated. The architecture 1500 includes functionality that may be provided by hardware and/or software, and that may be combined into a single hardware platform or distributed among multiple hardware platforms. For purposes of illustration, the access server in the following examples is described as a single device, but it is understood that the term applies equally to any type of environment (including a distributed environment) in which at least a portion of the functionality attributed to the access server is present.

In the present example, the architecture includes web services 1502 (e.g., based on functionality provided by XML, SOAP, NET, MONO), web server 1504 (using, for example, Apache or IIS), and database 1506 (using, for example, mySQL or SQLServer) for storing and retrieving routing tables 1508, profiles 1510, and one or more session tables 1512. Functionality for a STUN (Simple Traversal of UDP through NATs (Network Address Translation)) server 1514 is also present in the architecture 1500. As is known, STUN is a protocol for assisting devices that are behind a NAT firewall or router with their packet routing. The architecture 1500 may also include a redirect server 1516 for handling requests originating outside of the system 1400. One or both of the STUN server 1514 and redirect server 1516 may be incorporated into the access server 1402 or may be a standalone device. In the present embodiment, both the server 1504 and the redirect server 1516 are coupled to the database 1506.

Figure 15B:
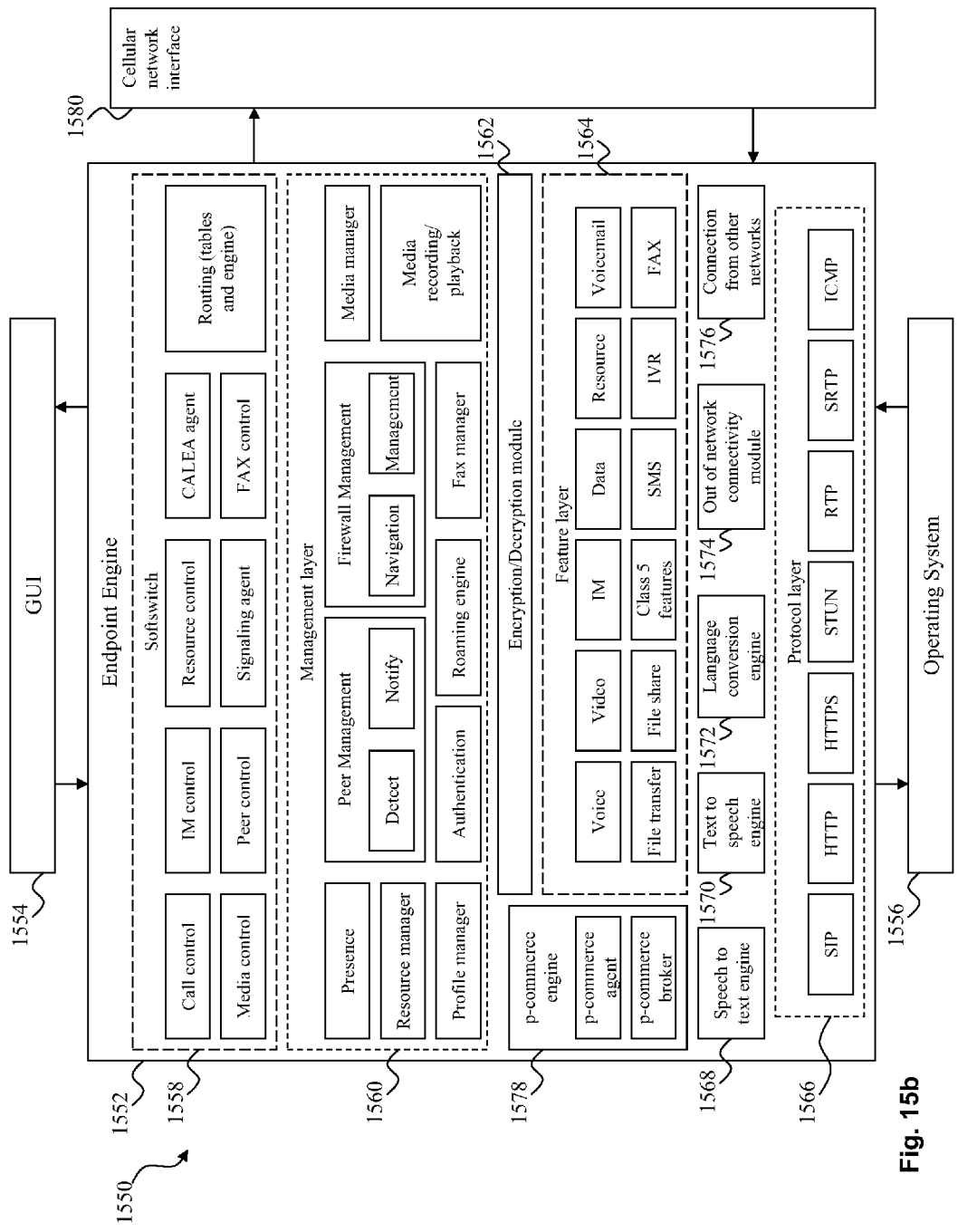
FIG. 15b illustrates one embodiment of an endpoint architecture that may be used by a device within the system of FIG. 14.

Referring to FIG. 15b, one embodiment of an architecture 1550 for the endpoint 1404 (which may be similar or identical to the endpoint 1406) of FIG. 14 is illustrated. It is understood that that term "endpoint" may refer to many different devices having some or all of the described functionality, including a computer, a VoIP telephone, a personal digital assistant, a cellular phone, or any other device having an IP stack upon which the needed protocols may be run. The architecture 1550 includes an endpoint engine 1552 positioned between a graphical user interface (GUI) 1554 and an operating system 1556. The GUI 1554 provides user access to the endpoint engine 1552, while the operating system 1556 provides underlying functionality, as is known to those of skill in the art.

The endpoint engine 1552 may include multiple components and layers that support the functionality required to perform the operations of the endpoint 1404. For example, the endpoint engine 1552 includes a softswitch 1558, a management layer 1560, an encryption/decryption module 1562, a feature layer 1564, a protocol layer 1566, a speech-to-text engine 1568, a text-to-speech engine 1570, a language conversion engine 1572, an out-of-network connectivity module 1574, a connection from other networks module 1576, a p-commerce (e.g., peer commerce) engine 1578 that includes a p-commerce agent and a p-commerce broker, and a cellular network interface module 1580.

Each of these components/layers may be further divided into multiple modules. For example, the softswitch 1558 includes a call control module, an instant messaging (IM) control module, a resource control module, a CALEA (Communications Assistance to Law Enforcement Act) agent, a media control module, a peer control module, a signaling agent, a fax control module, and a routing module.

The management layer 1560 includes modules for presence (i.e., network presence), peer management (detecting peers and notifying peers of being online), firewall management (navigation and management), media management, resource management, profile management, authentication, roaming, fax management, and media playback/recording management.

The encryption/decryption module 1562 provides encryption for outgoing packets and decryption for incoming packets. In the present example, the encryption/decryption module 1562 provides application level encryption at the source, rather than at the network. However, it is understood that the encryption/decryption module 1562 may provide encryption at the network in some embodiments.

The feature layer 1564 provides support for various features such as voice, video, IM, data, voicemail, file transfer, file sharing, class 5 features, short message service (SMS), interactive voice response (IVR), faxes, and other resources. The protocol layer 1566 includes protocols supported by the endpoint, including SIP, HTTP, HTTPS, STUN, RTP, SRTP, and ICMP. It is understood that these are examples only, and that fewer or more protocols may be supported.

The speech-to-text engine 1568 converts speech received by the endpoint (e.g., via a microphone or network) into text, the text-to-speech engine 1570 converts text received by the endpoint into speech (e.g., for output via a speaker), and the language conversion engine 1572 may be configured to convert inbound or outbound information (text or speech) from one language to another language. The out-of-network connectivity module 1574 may be used to handle connections between the endpoint and external devices (as described with respect to FIG. 12), and the connection from other networks module 1576 handles incoming connection attempts from external devices. The cellular network interface module 1580 may be used to interact with a wireless network.

With additional reference to FIG. 15c, the cellular network interface module 1580 is illustrated in greater detail. Although not shown in FIG. 15b, the softswitch 1558 of the endpoint architecture 1550 includes a cellular network interface for communication with the cellular network interface module 1580. In addition, the cellular network interface module 1580 includes various components such as a call control module, a signaling agent, a media manager, a protocol stack, and a device interface. It is noted that these components may correspond to layers within the endpoint architecture 1550 and may be incorporated directly into the endpoint architecture in some embodiments.

Referring again to FIG. 15b, in operation, the softswitch 1558 uses functionality provided by underlying layers to handle connections with other endpoints and the access server 1402, and to handle services needed by the endpoint 1404. For example, as is described below in greater detail with respect to FIGS. 16a and 16b, incoming and outgoing calls may utilize multiple components within the endpoint architecture 1550.

Figure 16A:
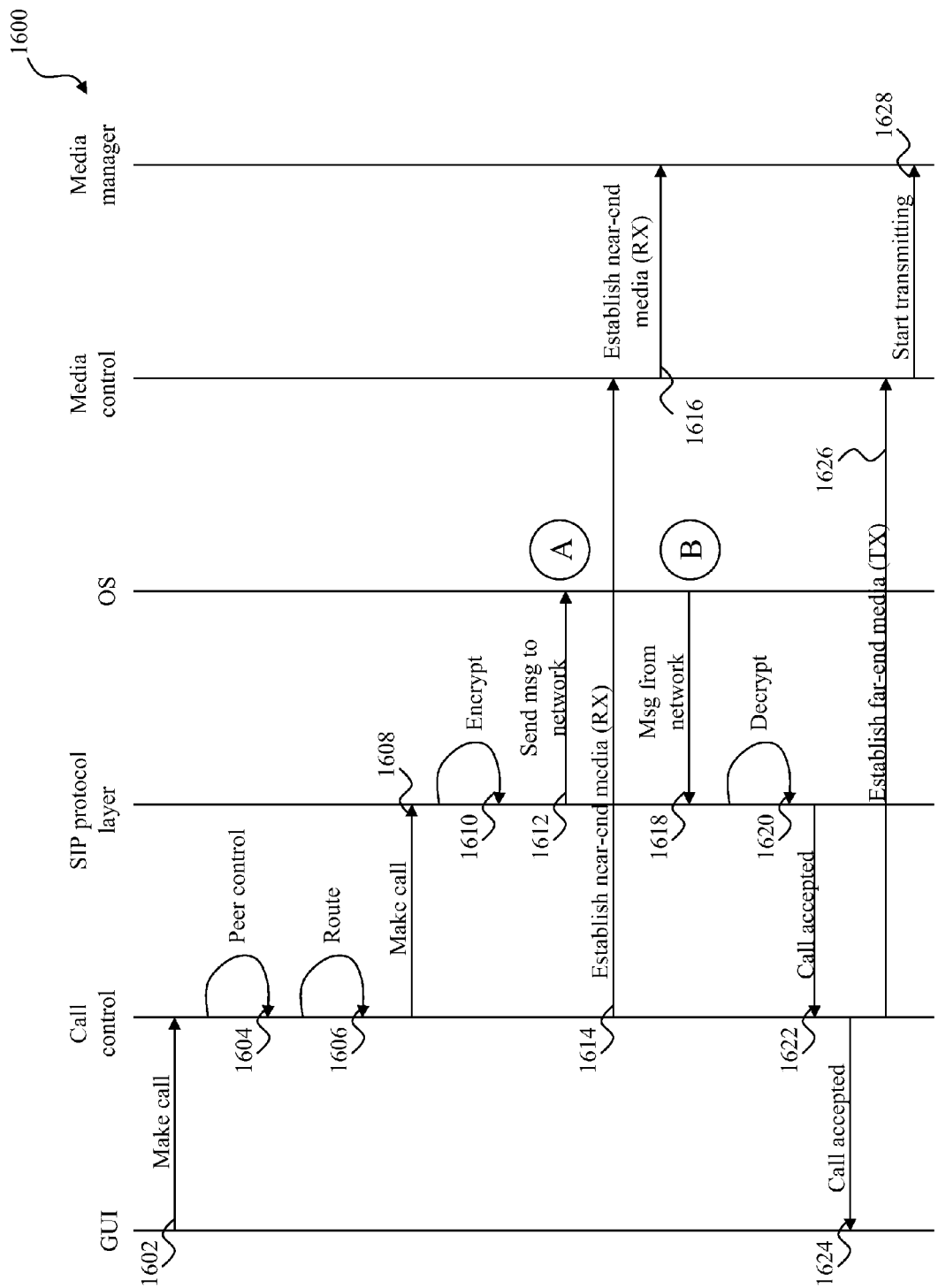
FIG. 16a is a sequence diagram illustrating the interaction of various components of FIG. 15b when placing a call.

Referring to FIG. 16a, a sequence diagram 1600 illustrates an exemplary process by which the endpoint 1404 may initiate a call to the endpoint 1406 using various components of the architecture 1550. Prior to step 1602, a user (not shown) initiates a call via the GUI 1554. In step 1602, the GUI 1554 passes a message to the call control module (of the softswitch 1558) to make the call. The call control module contacts the peer control module (softswitch 1558) in step 1604, which detects the peer (if not already done), goes to the routing table (softswitch 1558) for the routing information, and performs similar operations. It is understood that not all interactions are illustrated. For example, the peer control module may utilize the peer management module (of the management layer 1560) for the peer detection. The call control module then identifies a route for the call in step 1606, and sends message to the SIP protocol layer (of the protocol layer 1566) to make the call in step 1608. In step 1610, the outbound message is encrypted (using the encryption/decryption module 1562) and the message is sent to the network via the OS 1556 in step 1612.

After the message is sent and prior to receiving a response, the call control module instructs the media control module (softswitch 1558) to establish the needed near-end media in step 1614. The media control module passes the instruction to the media manager (of the management layer 1560) in step 1616, which handles the establishment of the near-end media.

Figure 16B:
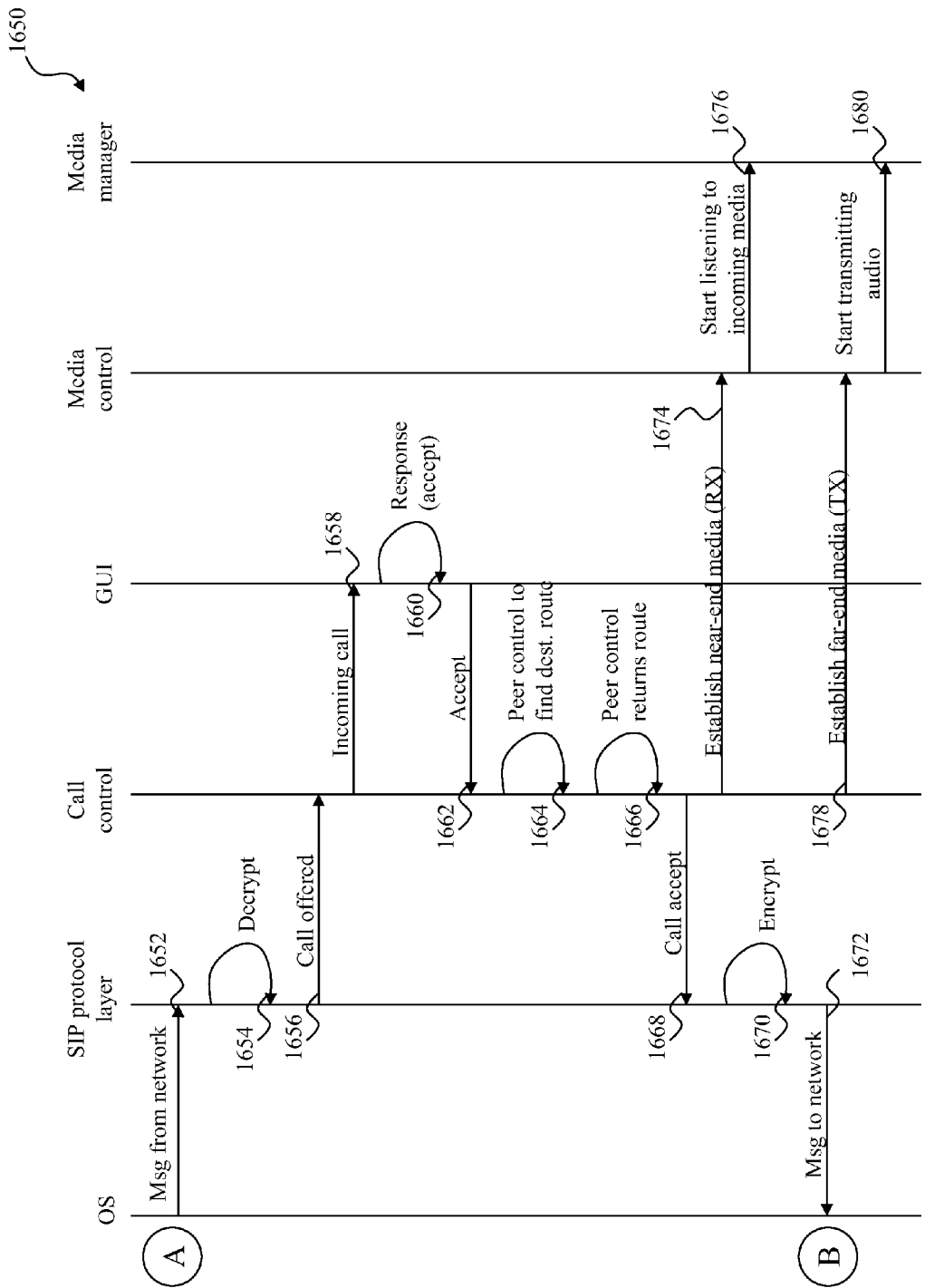
FIG. 16b is a sequence diagram illustrating the interaction of various components of FIG. 15b when receiving a call.

With additional reference to FIG. 16*b*, the message sent by the endpoint 1404 in step 1612 (FIG. 16*a*) is received by the endpoint 1406 and passed from the OS to the SIP protocol layer in step 1652. The message is decrypted in step 1654 and the call is offered to the call control module in step 1656. The call control module notifies the GUI of an incoming call in step 1658 and the GUI receives input identifying whether the call is accepted or rejected (e.g., by a user) in step 1660. In the present example, the call is accepted and the GUI passes the acceptance to the call control module in step 1662. The call control module contacts the peer control module in step 1664, which identifies a route to the calling endpoint and returns the route to the call control module in step 1666. In steps 1668 and 1670, the call control module informs the SIP protocol layer that the call has been accepted and the message is encrypted using the encryption/decryption module. The acceptance message is then sent to the network via the OS in step 1672.

In the present example, after the call control module passes the acceptance message to the SIP protocol layer, other steps may occur to prepare the endpoint 1406 for the call. For example, the call control module instructs the media control module to establish near-end media in step 1674, and the media control module instructs the media manager to start listening to incoming media in step 1676. The call control module also instructs the media control module to establish far-end media (step 1678), and the media control module instructs the media manager to start transmitting audio in step 1680.

Returning to FIG. 16*a*, the message sent by the endpoint 1406 (step 1672) is received by the OS and passed on to the SIP protocol layer in step 1618 and decrypted in step 1620. The message (indicating that the call has been accepted) is passed to the call control module in step 1622 and from there to the GUI in step 1624. The call control module then instructs the media control module to establish far-end media in step 1626, and the media control module instructs the media manager to start transmitting audio in step 1628.

Figure 17:
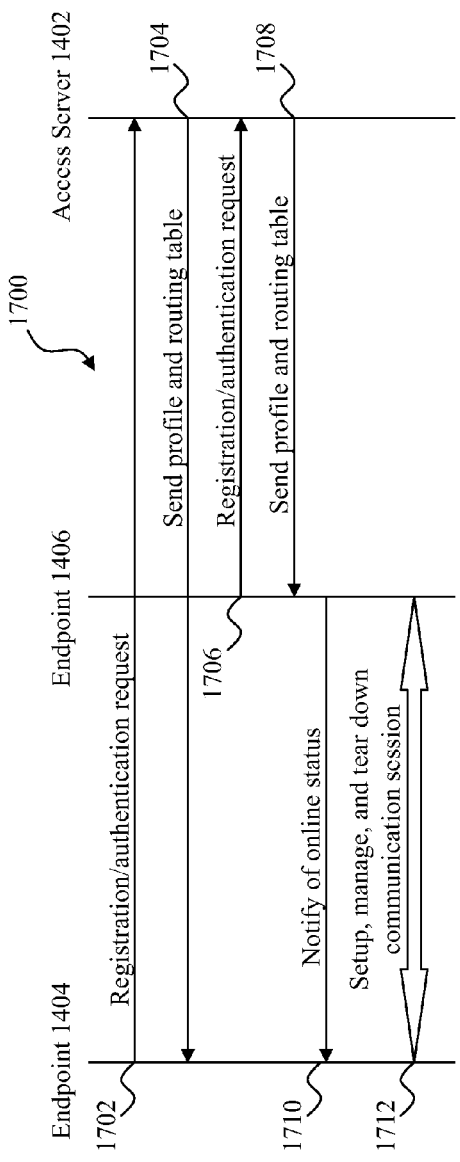
FIG. 17 is a sequence diagram illustrating an exemplary process by which an endpoint of FIG. 14 may be authenticated and communicate with another endpoint.

Referring to FIG. 17 (and using the endpoint 1404 as an example), a sequence diagram 1700 illustrates an exemplary process by which the endpoint 1404 may authenticate with the access server 1402 and then communicate with the endpoint 1406. As will be described, after authentication, all communication (both signaling and media traffic) between the endpoints 1404 and 1406 occurs directly without any intervention by the access server 1402. In the present example, it is understood that neither endpoint is online at the beginning of the sequence, and that the endpoints 1404 and 1406 are "buddies." As described above, buddies are endpoints that have both previously agreed to communicate with one another.

In step 1702, the endpoint 1404 sends a registration and/or authentication request message to the access server 1402. If the endpoint 1404 is not registered with the access server 1402, the access server will receive the registration request (e.g., user ID, password, and email address) and will create a profile for the endpoint (not shown). The user ID and password will then be used to authenticate the endpoint 1404 during later logins. It is understood that the user ID and password may enable the user to authenticate from any endpoint, rather than only the endpoint 1404.

Upon authentication, the access server 1402 updates a session table residing on the server to indicate that the user ID currently associated with the endpoint 1404 is online. The access server 1402 also retrieves a buddy list associated with the user ID currently used by the endpoint 1404 and identifies which of the buddies (if any) are online using the session table. As the endpoint 1406 is currently offline, the buddy list will reflect this status. The access server 1402 then sends the profile information (e.g., the buddy list) and a routing table to the endpoint 1404 in step 1704. The routing table contains address information for online members of the buddy list. It is understood that steps 1702 and 1704 represent a make and break connection that is broken after the endpoint 1404 receives the profile information and routing table.

In steps 1706 and 1708, the endpoint 1406 and access server 1402 repeat steps 1702 and 1704 as described for the endpoint 1404. However, because the endpoint 1404 is online when the endpoint 1406 is authenticated, the profile information sent to the endpoint 1406 will reflect the online status of the endpoint 1404 and the routing table will identify how to directly contact it. Accordingly, in step 1710, the endpoint 1406 sends a message directly to the endpoint 1404 to notify the endpoint 1404 that the endpoint 1406 is now online. This also provides the endpoint 1404 with the address information needed to communicate directly with the endpoint 1406. In step 1712, one or more communication sessions may be established directly between the endpoints 1404 and 1406.

Additional details of endpoints and endpoint functionality, including routing and NAT traversal functionality that may be used to establish and maintain a sharing session as described herein, are provided in U.S. Pat. No. 7,656,870, filed on Mar. 15, 2005, and entitled SYSTEM AND METHOD FOR PEER-TO-PEER HYBRID COMMUNICATIONS; U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS; and U.S. patent application Ser. No. 12/705,925, filed on Feb. 15, 2010, and entitled SYSTEM AND METHOD FOR STRATEGIC ROUTING IN A PEER-TO-PEER ENVIRONMENT, as previously incorporated by reference in their entirety.

Figure 18:
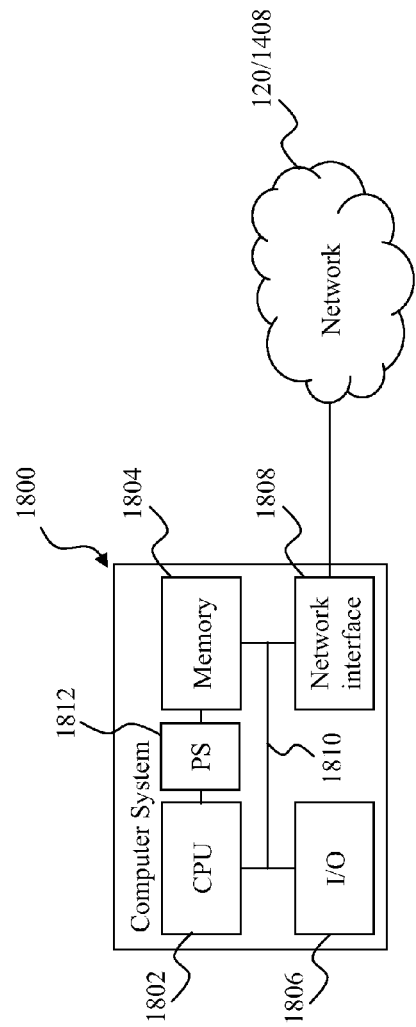
FIG. 18 is a simplified diagram of one embodiment of a computer system that may be used in embodiments of the present disclosure as a communication device and/or an endpoint.

Referring to FIG. 18, one embodiment of a computer system 1800 is illustrated. The computer system 1800 is one possible example of a system component or computing device such as a communication device, a document server, an endpoint, and/or an access server. The computer system 1800 may include a controller (e.g., a central processing unit ("CPU")) 1802, a memory unit 1804, an input/output ("I/O") device 1806, and a network interface 1808. The components 1802, 1804, 1806, and 1808 are interconnected by a transport system (e.g., a bus) 1810. A power supply (PS) 1812 may provide power to components of the computer system 1800, such as the CPU 1802 and memory unit 1804. It is understood that the computer system 1800 may be differently configured and that each of the listed components may actually represent several different components. For example, the CPU 1802 may actually represent a multi-processor or a distributed processing system; the memory unit 1804 may include different levels of cache memory, main memory, hard disks, and remote storage locations; the I/O device 1806 may include monitors, keyboards, and the like; and the network interface 1808 may include one or more network cards providing one or more wired and/or wireless connections to the network 120 (FIG. 1) and/or the network 1408 (FIG. 14). Therefore, a wide range of flexibility is anticipated in the configuration of the computer system 1800.

The computer system 1800 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 1800. The operating system, as well as other instructions (e.g., for the endpoint engine 1552 of FIG. 15b if an endpoint), may be stored in the memory unit 1804 and executed by the processor 1802. For example, if the computer system 1800 is one of communication devices 102 and 104 or one of the endpoints 1404 and 1406, the memory unit 1804 may include instructions for performing some or all of the message sequences and methods described with respect to FIGS. 2-12 and 16a-17.

Accordingly, in one embodiment, a method for sharing a document may comprise receiving, by a first communication device, input indicating that a document on the first communication device is to be shared with a second communication device; determining, by the first communication device, that the document is a first document type and that the first communication device does not have access to an application required to display the first document type; sending, by the first communication device, information representing at least one parameter to be used in processing the document to a document server; sending, by the first communication device, the document to the document server for processing into a plurality of pages based on the at least one parameter, wherein each of the plurality of pages is a second document type that is different from the first document type, and wherein the second document type is supported by an application present on the first communication device; receiving, by the first communication device from the document server, access information corresponding to a first page of the plurality of pages, wherein the address information identifies a location of the first page on a network accessible storage location; retrieving, by the first communication device, the first page from the network accessible storage location using the access information; sending, by the first communication device, information representing at least one parameter of the first page and access information for the first page to the second communication device; displaying, by the first communication device, the first page on a display; selecting, by the first communication device, a second page of the plurality of pages; sending, by the first communication device, information requesting the second page to the network accessible storage location; retrieving, by the first communication device, the second page from the network accessible storage location; sending, by the first communication device, information needed to obtain the second page from the network accessible storage location to the second communication device; and displaying, by the first communication device, the second page on the display. The method may further comprise receiving, by the first communication device from the document server, a plurality of network addresses corresponding to the plurality of pages, wherein each of the plurality of network addresses identifies the location of one of the plurality of pages on the network accessible storage location. Sending the information needed to obtain the second page from the network accessible storage location to the second communication device may include sending a network address that corresponds to the second page from the plurality of network addresses. The method may further comprise receiving, by the first communication device from the document server, an index of the plurality of pages, wherein the access information received from the document server includes a base network address of the plurality of pages, and wherein the first communication device is configured to retrieve any of the plurality of pages using the index and the base network address. Sending the information needed to obtain the second page from the network accessible storage location to the second communication device may include sending the base network address and index information corresponding to the second page. Sending, by the first communication device, information needed to obtain the second page from the network accessible storage location to the second communication device may include instructing the second communication device to retrieve the second page. The method may further comprise performing, by the first communication device, an edit to the first page to create a modified first page; and sending, by the first communication device, the edit to the second communication device. Sending the edit may include sending the modified first page. The method may further comprise sending, by the first communication device, the modified first page to the document server. The method may further comprise receiving, by the first communication device, an edit to the first page from the second communication device, wherein the edit creates a modified first page. The information representing at least one parameter to be used in processing the document may include the first document type, a display resolution of the first communication device, and at least one of the second document type and a share mode, wherein the share mode identifies a view only mode or a view/edit mode. The method may further comprise receiving, by the first communication device from the document server, information corresponding to the plurality of pages, wherein the information includes a total number of pages and the second document type. Sending, by the first communication device, information representing at least one parameter of the first page and the access information of the first page to the second communication device may include sending a total number of pages, a page prefix, and at least one of the second document type and a share mode, wherein the share mode identifies a view only mode or a view/edit mode. The method may further comprise receiving, by the first communication device, an update from the document server between the step of sending the document to the document server for processing and the step of receiving the access information by the first communication device from the document server, wherein the update identifies that the processing is in progress. The network accessible storage location may be the document server. Signaling between the first and second communication devices and between the first communication device and the document server may be Session Initiation Protocol signaling. The first and second communication devices may be peer-to-peer devices that communicate directly with each other and the method may further comprise establishing, by the first communication device, a peer-to-peer session with the second communication device prior to sending the information representing at least one parameter of the first page and the access information of the first page to the second communication device. The second communication device may not have access to an application required for use of the first document type and the document may not be able to be opened on the second communication device, and the second document type may be supported by an application present on the second communication device.

In another embodiment, a method for sharing a document may comprise receiving, by a first communication device, a message from a second communication device indicating that a document on the second communication device is to be shared with the first communication device, wherein the document is a first document type and the first and second communication devices do not have access to an application required to display the first document type; receiving, by the first communication device from the second communication device, information corresponding to a first page of a plurality of pages that represent the document, wherein each of the plurality of pages is a second document type that is different from the first document type, and wherein the second document type is supported by an application present on the second communication device, and wherein the information includes access information representing a network address corresponding to the first page of the plurality of pages that identifies a location of the first page on a network accessible storage location; retrieving, by the first communication device, the first page from the network accessible storage location using the network address; displaying, by the first communication device, the first page on a display; receiving, by the first communication device from the second communication device, information corresponding to a second page of the plurality of pages; retrieving, by the first communication device, the second page from the network accessible storage location; and displaying, by the first communication device, the second page on the display. The information corresponding to the second page may include a network address of the second page, wherein the first communication device does not know the network address of the second page until it receives the information from the first communication device. The information corresponding to the second page may include an instruction to retrieve the second page. The method may further comprise performing, by the first communication device, an edit to the first page to create a modified first page; and sending, by the first communication device, the edit to the second communication device. Sending the edit may include sending the modified first page. The information corresponding to the first page may include a total number of pages, a page prefix, and at least one of the second document type and a share mode, wherein the share mode identifies a view only mode or a view/edit mode. The first and second communication devices may be peer-to-peer devices that communicate directly with each other and the method may further comprise establishing, by the first communication device, a peer-to-peer session with the second communication device prior to receiving, by the first communication device, the message from the second communication device.

In yet another embodiment, a communication device may comprise a network interface configured to send and receive communications via a wireless network; a controller coupled to the network interface; and a memory coupled to the controller, the memory having a plurality of instructions stored thereon for execution by the controller, the instructions including instructions for: receiving input indicating that a document on the first communication device is to be shared with a second communication device; determining that the document is a first document type and that the communication device does not have access to an application required to open the first document type; sending information representing at least one parameter to be used in processing the document to a document server; sending the document to the document server for processing into a plurality of pages based on the at least one parameter, wherein each of the plurality of pages is a second document type that is different from the first document type, and wherein the second document type is supported by an application present on the communication device; receiving access information corresponding to a first page of the plurality of pages from the document server, wherein the address information identifies a location of the first page on a network accessible storage location; retrieving the first page from the network accessible storage location using the access information; sending information representing at least one parameter of the first page and access information for the first page to the second communication device; displaying the first page on a display; receiving input selecting a second page of the plurality of pages; sending information requesting the second page to the network accessible storage location; retrieving the second page from the network accessible storage location; sending information needed to obtain the second page from the network accessible storage location to the second communication device; and displaying the second page on the display. The instructions may further include instructions for establishing a peer-to-peer session with the second communication device prior to sending the information representing at least one parameter of the first page and access information for the first page to the second communication device. The communication device may communicate via the wireless network and the instructions may further comprise instructions for establishing a wireless communication link with the wireless network prior to sending the information representing at least one parameter to be used in processing the document to the document server. The communication device may communicate via the wireline network and the instructions may further comprise instructions for establishing a wireline communication link with the wireline network prior to sending the information representing at least one parameter to be used in processing the document to the document server.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for sharing a document comprising:
receiving, by a first communication device, input indicating that a document on the first communication device is to be shared with a second communication device;
determining, by the first communication device, that the document is a first document type and that the first communication device does not have access to an application required to display the first document type;
sending, by the first communication device, information representing at least one parameter to be used in processing the document to a document server;
sending, by the first communication device, the document to the document server for processing into a plurality of pages based on the at least one parameter, wherein each of the plurality of pages is a second document type that is different from the first document type, and wherein the second document type is supported by an application present on the first communication device;

receiving, by the first communication device from the document server, access information corresponding to a first page of the plurality of pages, wherein the access information identifies a location of the first page on a network accessible storage location;

retrieving, by the first communication device, the first page from the network accessible storage location using the access information;

sending, by the first communication device, information representing at least one parameter of the first page and access information for the first page to the second communication device;

displaying, by the first communication device, the first page on a display;

selecting, by the first communication device, a second page of the plurality of pages;

sending, by the first communication device, information requesting the second page to the network accessible storage location;

retrieving, by the first communication device, the second page from the network accessible storage location;

sending, by the first communication device, information needed to obtain the second page from the network accessible storage location to the second communication device; and displaying, by the first communication device, the second page on the display.

2. The method of claim 1 further comprising receiving, by the first communication device from the document server, a plurality of network addresses corresponding to the plurality of pages, wherein each of the plurality of network addresses identifies the location of one of the plurality of pages on the network accessible storage location.

3. The method of claim 2 wherein sending the information needed to obtain the second page from the network accessible storage location to the second communication device includes sending a network address that corresponds to the second page from the plurality of network addresses.

4. The method of claim 1 further comprising receiving, by the first communication device from the document server, an index of the plurality of pages, wherein the access information received from the document server includes a base network address of the plurality of pages, and wherein the first communication device is configured to retrieve any of the plurality of pages using the index and the base network address.

5. The method of claim 4 wherein sending the information needed to obtain the second page from the network accessible storage location to the second communication device includes sending the base network address and index information corresponding to the second page.

6. The method of claim 1 wherein sending, by the first communication device, information needed to obtain the second page from the network accessible storage location to the second communication device includes instructing the second communication device to retrieve the second page.

7. The method of claim 1 further comprising:
performing, by the first communication device, an edit to the first page to create a modified first page; and
sending, by the first communication device, the edit to the second communication device.

8. The method of claim 7 wherein sending the edit includes sending the modified first page.

9. The method of claim 8 further comprising sending, by the first communication device, the modified first page to the document server.

10. The method of claim 7 further comprising receiving, by the first communication device, an edit to the first page from the second communication device, wherein the edit creates a modified first page.

11. The method of claim 1 wherein the information representing at least one parameter to be used in processing the document includes the first document type, a display resolution of the first communication device, and at least one of the second document type and a share mode, wherein the share mode identifies a view only mode or a view/edit mode.

12. The method of claim 1 further comprising receiving, by the first communication device from the document server, information corresponding to the plurality of pages, wherein the information includes a total number of pages and the second document type.

13. The method of claim 1 wherein sending, by the first communication device, information representing at least one parameter of the first page and the access information of the first page to the second communication device includes sending a total number of pages, a page prefix, and at least one of the second document type and a share mode, wherein the share mode identifies a view only mode or a view/edit mode.

14. The method of claim 1 further comprising receiving, by the first communication device, an update from the document server between the step of sending the document to the document server for processing and the step of receiving the access information by the first communication device from the document server, wherein the update identifies that the processing is in progress.

15. The method of claim 1 wherein the network accessible storage location is the document server.

16. The method of claim 1 wherein signaling between the first and second communication devices and between the first communication device and the document server is Session Initiation Protocol signaling.

17. The method of claim 1 wherein the first and second communication devices are peer-to-peer devices that communicate directly with each other and wherein the method further comprises establishing, by the first communication device, a peer-to-peer session with the second communication device prior to sending the information representing at least one parameter of the first page and the access information of the first page to the second communication device.

18. The method of claim 1 wherein the second communication device does not have access to an application required for use of the first document type and the document cannot be opened on the second communication device, and wherein the second document type is supported by an application present on the second communication device.

19. A method for sharing a document comprising:
receiving, by a first communication device, a message from a second communication device indicating that a document on the second communication device is to be shared with the first communication device, wherein the document is a first document type and the first and second communication devices do not have access to an application required to display the first document type;
receiving, by the first communication device from the second communication device, information corresponding to a first page of a plurality of pages that represent the document, wherein each of the plurality of pages is a second document type that is different from the first document type, and wherein the second document type is supported by an application present on the second communication device, and wherein the information includes access information representing a network address corresponding to the first page of the plurality of pages that identifies a location of the first page on a network accessible storage location;
retrieving, by the first communication device, the first page from the network accessible storage location using the network address;
displaying, by the first communication device, the first page on a display;
receiving, by the first communication device from the second communication device, information corresponding to a second page of the plurality of pages;
retrieving, by the first communication device, the second page from the network accessible storage location; and
displaying, by the first communication device, the second page on the display.

20. The method of claim 19 wherein the information corresponding to the second page includes a network address of the second page, wherein the first communication device does not know the network address of the second page until the first communication device receives the information from the second communication device.

21. The method of claim 19 wherein the information corresponding to the second page includes an instruction to retrieve the second page.

22. The method of claim 19 further comprising:
performing, by the first communication device, an edit to the first page to create a modified first page; and
sending, by the first communication device, the edit to the second communication device.

23. The method of claim 22 wherein sending the edit includes sending the modified first page.

24. The method of claim 19 wherein the information corresponding to the first page includes a total number of pages, a page prefix, and at least one of the second document type and a share mode, wherein the share mode identifies a view only mode or a view/edit mode.

25. The method of claim 19 wherein the first and second communication devices are peer-to-peer devices that communicate directly with each other and wherein the method further comprises establishing, by the first communication device, a peer-to-peer session with the second communication device prior to receiving, by the first communication device, the message from the second communication device.

26. A communication device comprising:
a network interface configured to send and receive communications via at least one of a wireless and a wireline network;
a controller coupled to the network interface; and
a memory coupled to the controller, the memory having a plurality of instructions stored thereon for execution by the controller, for:
receiving input indicating that a document on the communication device is to be shared with a second communication device;
determining that the document is a first document type and that the communication device does not have access to an application required to open the first document type;
sending information representing at least one parameter to be used in processing the document to a document server;
sending the document to the document server for processing into a plurality of pages based on the at least one parameter, wherein each of the plurality of pages is a second document type that is different from the first document type, and wherein the second document type is supported by an application present on the communication device;
receiving access information corresponding to a first page of the plurality of pages from the document server, wherein the access information identifies a location of the first page on a network accessible storage location;
retrieving the first page from the network accessible storage location using the access information;
sending information representing at least one parameter of the first page and access information for the first page to the second communication device;
displaying the first page on a display;
receiving input selecting a second page of the plurality of pages;
sending information requesting the second page to the network accessible storage location;
retrieving the second page from the network accessible storage location;
sending information needed to obtain the second page from the network accessible storage location to the second communication device; and
displaying the second page on the display.

27. The communication device of claim 26 wherein the instructions further include instructions for establishing a peer-to-peer session with the second communication device prior to sending the information representing at least one parameter of the first page and access information for the first page to the second communication device.

28. The method of claim 26 wherein the communication device communicates via the wireless network and wherein the instructions further comprise instructions for establishing a wireless communication link with the wireless network prior to sending the information representing at least one parameter to be used in processing the document to the document server.

29. The method of claim 26 wherein the communication device communicates via the wireline network and wherein the instructions further comprise instructions for establishing a wireline communication link with the wireline network prior to sending the information representing at least one parameter to be used in processing the document to the document server.

* * * * *